(12) United States Patent
Usoro et al.

(10) Patent No.: US 6,645,116 B1
(45) Date of Patent: Nov. 11, 2003

(54) SIX SPEED PLANETARY TRANSMISSION MECHANISMS WITH THREE INTERCONNECTED GEARSETS

(75) Inventors: Patrick Benedict Usoro, Troy, MI (US); Norman Kenneth Bucknor, Troy, MI (US); Chunhao J. Lee, Troy, MI (US); Madhusudan Raghavan, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/133,082

(22) Filed: Apr. 26, 2002

(51) Int. Cl.$^7$ .................................................. F16H 3/62
(52) U.S. Cl. ...................... 475/276; 475/280; 475/282; 475/284; 475/286; 475/314; 475/320; 475/326
(58) Field of Search ................................ 475/269, 275, 475/276, 280, 282, 284, 286, 296, 311, 314, 317, 320, 323, 326

(56) References Cited

U.S. PATENT DOCUMENTS

| | | | | |
|---|---|---|---|---|
| 3,941,013 A | * | 3/1976 | Miller | 475/276 |
| 4,046,031 A | * | 9/1977 | Ott et al. | 475/280 |
| 4,070,927 A | | 1/1978 | Polak | 74/765 |
| 4,395,925 A | * | 8/1983 | Gaus | 475/284 X |
| 5,063,813 A | * | 11/1991 | Lentz | 477/131 |
| 5,098,357 A | * | 3/1992 | Asada et al. | 475/284 X |
| 5,106,352 A | | 4/1992 | Lepelletier | 475/280 |
| 5,542,889 A | | 8/1996 | Pierce et al. | 475/275 |
| 5,599,251 A | | 2/1997 | Beim et al. | 475/275 |
| 6,071,208 A | | 6/2000 | Koivunen | 475/275 |
| 6,083,135 A | | 7/2000 | Baldwin et al. | 475/276 |
| 6,530,858 B1 | * | 3/2003 | Usoro et al. | 475/296 |

FOREIGN PATENT DOCUMENTS

| | | |
|---|---|---|
| EP | 1033510 A1 | 9/2000 |
| JP | 404290649 | * 10/1992 |

\* cited by examiner

*Primary Examiner*—Ha Ho
(74) *Attorney, Agent, or Firm*—Kathryn A. Marra

(57) ABSTRACT

A family of transmissions has a plurality of members each of which includes three planetary gearsets, five torque-transmitting mechanisms, an input shaft, and an output shaft. The torque-transmitting mechanisms are selectively engageable in combinations of three to establish at least six forward speed ratios and one reverse speed ratio between the input shaft and the output shaft of each family member. Each family member has two continuous interconnecting members, one of which interconnects a member the first planetary gearset with a member of the second planetary gearset, and the second of which connects another member of the second planetary gearset with a member of the third planetary gearset. The five torque-transmitting mechanisms complete the connections between the planetary gear members and/or the transmission housing which are necessary to provide the six forward speed ratios and one reverse speed ratio.

6 Claims, 20 Drawing Sheets

| | RATIOS | 50 | 52 | 54 | 56 | 58 |
|---|---|---|---|---|---|---|
| REVERSE | -2.75 | X | | | X | X |
| NEUTRAL | 0.00 | | | | X | X |
| 1 | 5.00 | | | X | X | X |
| 2 | 3.00 | | X | X | X | |
| 3 | 1.76 | | X | X | | X |
| 4 | 1.21 | X | X | | | X |
| 5 | 1.00 | X | X | X | | |
| 6 | 0.80 | X | | X | | X |

(X=engaged)

Ring Gear/Sun Gear Tooth Ratios: $\frac{R1}{S1}=1.65, \frac{R2}{S2}=1.82, \frac{R3}{S3}=1.50$

| Ratio Spread | 6.21 |
|---|---|
| Ratio Steps | |
| REV/1 | -0.55 |
| 1/2 | 1.67 |
| 2/3 | 1.71 |
| 3/4 | 1.45 |
| 4/5 | 1.21 |
| 5/6 | 1.24 |

| | RATIOS | 150 | 152 | 154 | 156 | 158 |
|---|---|---|---|---|---|---|
| REVERSE | -2.22 | X | | X | | X |
| NEUTRAL | 0.00 | | | X | | X |
| 1 | 4.00 | | X | X | | X |
| 2 | 2.49 | | X | | X | X |
| 3 | 1.65 | X | X | | | X |
| 4 | 1.20 | X | X | | X | |
| 5 | 1.00 | X | X | X | | |
| 6 | 0.76 | X | | X | X | |

(X=engaged)

Ring Gear/Sun Gear Tooth Ratios: $\frac{R1}{S1}=1.65, \frac{R2}{S2}=1.80, \frac{R3}{S3}=3.00$

| Ratio Spread | 5.25 |
|---|---|
| Ratio Steps | |
| REV/1 | -0.56 |
| 1/2 | 1.61 |
| 2/3 | 1.51 |
| 3/4 | 1.37 |
| 4/5 | 1.20 |
| 5/6 | 1.31 |

| | RATIOS | 250 | 252 | 254 | 256 | 258 |
|---|---|---|---|---|---|---|
| REVERSE | -3.04 | X | | | X | X |
| NEUTRAL | 0.00 | | | X | X | |
| 1 | 4.81 | | X | X | X | |
| 2 | 3.28 | | | X | X | X |
| 3 | 2.02 | | X | X | | X |
| 4 | 1.20 | X | | X | | X |
| 5 | 1.00 | X | X | X | | |
| 6 | 0.73 | X | X | | | X |

(X=engaged)

Ring Gear/Sun Gear Tooth Ratios: $\frac{R1}{S1}=2.28, \frac{R2}{S2}=1.50, \frac{R3}{S3}=2.75$

| Ratio Spread | 6.56 |
|---|---|
| Ratio Steps | |
| REV/1 | -0.63 |
| 1/2 | 1.46 |
| 2/3 | 1.63 |
| 3/4 | 1.67 |
| 4/5 | 1.20 |
| 5/6 | 1.36 |

|  | RATIOS | 350 | 352 | 354 | 356 | 358 |
|---|---|---|---|---|---|---|
| REVERSE | -2.51 |  |  | X | X | X |
| NEUTRAL | 0.00 |  |  |  | X | X |
| 1 | 4.96 | X |  |  | X | X |
| 2 | 2.98 | X |  | X |  | X |
| 3 | 1.79 | X | X |  |  | X |
| 4 | 1.21 |  | X | X |  | X |
| 5 | 1.00 | X | X | X |  |  |
| 6 | 0.79 |  | X | X | X |  |

(X=engaged)

Ring Gear/Sun Gear Tooth Ratios: $\frac{R1}{S1}=1.51, \frac{R2}{S2}=1.50, \frac{R3}{S3}=1.51$

| Ratio Spread | 6.27 |
|---|---|
| Ratio Steps |  |
| REV/1 | -0.51 |
| 1/2 | 1.66 |
| 2/3 | 1.67 |
| 3/4 | 1.48 |
| 4/5 | 1.21 |
| 5/6 | 1.26 |

| | RATIOS | 450 | 452 | 454 | 456 | 458 |
|---|---|---|---|---|---|---|
| REVERSE | -215 | | | X | X | X |
| NEUTRAL | 0.00 | | | X | | X |
| 1 | 3.25 | X | | X | | X |
| 2 | 2.08 | X | X | | | X |
| 3 | 1.35 | | X | X | | X |
| 4 | 1.00 | X | X | X | | |
| 5 | 0.69 | | X | X | X | |
| 6 | 0.52 | X | X | | X | |

( X=engaged)

Ring Gear/Sun Gear Tooth Ratios: $\frac{R1}{S1}=1.51, \frac{R2}{S2}=1.84, \frac{R3}{S3}=2.25$

| Ratio Spread | 6.23 |
|---|---|
| Ratio Steps | |
| REV/1 | -0.66 |
| 1/2 | 1.56 |
| 2/3 | 1.54 |
| 3/4 | 1.35 |
| 4/5 | 1.45 |
| 5/6 | 1.32 |

| | RATIOS | 550 | 552 | 554 | 556 | 558 |
|---|---|---|---|---|---|---|
| REVERSE | -8.86 | X | | | X | X |
| NEUTRAL | 0.00 | X | | | | X |
| 1 | 3.25 | X | | X | | X |
| 2 | 2.11 | | X | X | | X |
| 3 | 1.31 | X | X | | | X |
| 4 | 1.00 | X | X | X | | |
| 5 | 0.70 | X | X | | X | |
| 6 | 0.51 | | X | X | X | |

(X = engaged)

Ring Gear/Sun Gear Tooth Ratios: $\frac{R1}{S1}=1.75, \frac{R2}{S2}=1.63, \frac{R3}{S3}=2.25$

| Ratio Spread | 6.42 |
|---|---|
| Ratio Steps | |
| REV/1 | -0.57 |
| 1/2 | 1.54 |
| 2/3 | 1.61 |
| 3/4 | 1.31 |
| 4/5 | 1.44 |
| 5/6 | 1.37 |

| | RATIOS | 650 | 652 | 654 | 656 | 658 |
|---|---|---|---|---|---|---|
| REVERSE | -2.05 | X | X | | | X |
| NEUTRAL | 0.00 | | | X | | X |
| 1 | 3.28 | | | X | X | X |
| 2 | 2.05 | | X | X | | X |
| 3 | 1.40 | | X | X | X | |
| 4 | 1.00 | X | X | X | | |
| 5 | 0.81 | X | | X | X | |
| 6 | 0.62 | X | X | | X | |

(X=engaged)

Ring Gear/Sun Gear Tooth Ratios: $\frac{R1}{S1}=2.28, \frac{R2}{S2}=1.63, \frac{R3}{S3}=3.01$

| Ratio Spread | 5.30 |
|---|---|
| Ratio Steps | |
| REV/1 | -0.63 |
| 1/2 | 1.60 |
| 2/3 | 1.46 |
| 3/4 | 1.40 |
| 4/5 | 1.23 |
| 5/6 | 1.31 |

| | RATIOS | 750 | 752 | 754 | 756 | 758 |
|---|---|---|---|---|---|---|
| REVERSE | -2.35 | X | X | | X | |
| NEUTRAL | 0.00 | | X | | X | |
| 1 | 4.26 | | X | | X | X |
| 2 | 2.65 | X | X | | | X |
| 3 | 1.64 | | X | X | | X |
| 4 | 1.00 | X | X | X | | |
| 5 | 0.74 | X | | X | | X |
| 6 | 0.56 | X | | X | X | |

(X=engaged)

Ring Gear/Sun Gear Tooth Ratios: $\frac{R1}{S1}=2.02, \frac{R2}{S2}=2.35, \frac{R3}{S3}=1.81$

| Ratio Spread | 7.60 |
|---|---|
| Ratio Steps | |
| REV/1 | -0.55 |
| 1/2 | 1.60 |
| 2/3 | 1.62 |
| 3/4 | 1.64 |
| 4/5 | 1.34 |
| 5/6 | 1.33 |

| | RATIOS | 850 | 852 | 854 | 856 | 858 |
|---|---|---|---|---|---|---|
| REVERSE | -1.75 | X | X | | | X |
| NEUTRAL | 0.00 | | X | | | X |
| 1 | 3.38 | | X | | X | X |
| 2 | 2.26 | X | X | | X | |
| 3 | 1.55 | | X | X | X | |
| 4 | 1.00 | X | X | X | | |
| 5 | 0.81 | X | | X | X | |
| 6 | 0.60 | X | | X | | X |

(X=engaged)

Ring Gear/Sun Gear Tooth Ratios: $\frac{R1}{S1}=1.82, \frac{R2}{S2}=1.51, \frac{R3}{S3}=2.91$

| Ratio Spread | 5.62 |
|---|---|
| Ratio Steps | |
| REV/1 | -0.52 |
| 1/2 | 1.50 |
| 2/3 | 1.46 |
| 3/4 | 1.55 |
| 4/5 | 1.24 |
| 5/6 | 1.35 |

| | RATIOS | 950 | 952 | 954 | 956 | 958 |
|---|---|---|---|---|---|---|
| REVERSE | -2.93 | | | X | X | X |
| NEUTRAL | 0.00 | | | | X | X |
| 1 | 3.41 | | X | | X | X |
| 2 | 1.96 | | X | X | | X |
| 3 | 1.39 | X | X | | | X |
| 4 | 1.00 | X | X | X | | |
| 5 | 0.75 | X | | X | | X |
| 6 | 0.55 | X | | X | X | |

(X=engaged)

Ring Gear/Sun Gear Tooth Ratios: $\frac{R1}{S1}=2.93, \frac{R2}{S2}=1.63, \frac{R3}{S3}=1.50$

| Ratio Spread | 6.21 |
|---|---|
| Ratio Steps | |
| REV/1 | -0.86 |
| 1/2 | 1.74 |
| 2/3 | 1.41 |
| 3/4 | 1.39 |
| 4/5 | 1.33 |
| 5/6 | 1.37 |

| | RATIOS | 1050 | 1052 | 1054 | 1056 | 1058 |
|---|---|---|---|---|---|---|
| REVERSE | -1.5 | | | X | X | X |
| NEUTRAL | 0.00 | | | X | X | |
| 1 | 2.18 | X | | X | X | |
| 2 | 1.51 | X | | X | | X |
| 3 | 1.00 | X | X | X | | |
| 4 | 0.61 | | X | X | | X |
| 5 | 0.50 | X | X | | | X |
| 6 | 0.38 | | X | | X | X |

(X=engaged)

Ring Gear/Sun Gear Tooth Ratios: $\frac{R1}{S1}=1.63, \frac{R2}{S2}=1.65, \frac{R3}{S3}=3.02$

| Ratio Spread | 5.74 |
|---|---|
| Ratio Steps | |
| REV/1 | -0.53 |
| 1/2 | 1.44 |
| 2/3 | 1.51 |
| 3/4 | 1.63 |
| 4/5 | 1.24 |
| 5/6 | 1.31 |

| | RATIOS | 1150 | 1152 | 1154 | 1156 | 1158 |
|---|---|---|---|---|---|---|
| REVERSE | -2.35 | X | X | | X | |
| NEUTRAL | 0.00 | X | X | | | |
| 1 | 2.49 | X | X | | | X |
| 2 | 1.44 | X | | X | | X |
| 3 | 1.00 | X | X | X | | |
| 4 | 0.74 | | X | X | | X |
| 5 | 0.55 | | X | X | X | |
| 6 | 0.44 | | | X | X | X |

(X=engaged)

Ring Gear/Sun Gear Tooth Ratios: $\frac{R1}{S1}=2.25, \frac{R2}{S2}=2.35, \frac{R3}{S3}=2.25$

| Ratio Spread | 5.60 |
|---|---|
| Ratio Steps | |
| REV/1 | -0.94 |
| 1/2 | 1.72 |
| 2/3 | 1.44 |
| 3/4 | 1.35 |
| 4/5 | 1.36 |
| 5/6 | 1.23 |

| | RATIOS | 1950 | 1952 | 1954 | 1956 | 1958 |
|---|---|---|---|---|---|---|
| REVERSE | -1.26 | | | X | X | X |
| NEUTRAL | 0.00 | | | X | | X |
| 1 | 2.49 | | X | X | | X |
| 2 | 1.46 | | X | X | X | |
| 3 | 1.00 | X | X | X | | |
| 4 | 0.69 | X | X | | X | |
| 5 | 0.54 | X | X | | | X |
| 6 | 0.39 | X | | X | | X |

( X=engaged )

Ring Gear/Sun Gear Tooth Ratios: $\frac{R1}{S1}=1.82, \frac{R2}{S2}=2.57, \frac{R3}{S3}=2.27$

| Ratio Spread | 6.41 |
|---|---|
| Ratio Steps | |
| REV/1 | -0.51 |
| 1/2 | 1.71 |
| 2/3 | 1.46 |
| 3/4 | 1.44 |
| 4/5 | 1.28 |
| 5/6 | 1.40 |

| | RATIOS | 1350 | 1352 | 1354 | 1356 | 1358 |
|---|---|---|---|---|---|---|
| REVERSE | -1.26 | | X | X | | X |
| NEUTRAL | 0.00 | | | X | | X |
| 1 | 2.40 | X | | X | | X |
| 2 | 1.40 | X | | X | X | |
| 3 | 1.00 | X | X | X | | |
| 4 | 0.64 | X | X | | X | |
| 5 | 0.46 | X | X | | | X |
| 6 | 0.33 | | X | | X | X |

(X=engaged)

Ring Gear/Sun Gear Tooth Ratios: $\frac{R1}{S1}=2.50, \frac{R2}{S2}=2.50, \frac{R3}{S3}=2.00$

| Ratio Spread | 7.21 |
|---|---|
| Ratio Steps | |
| REV/1 | -0.75 |
| 1/2 | 1.72 |
| 2/3 | 1.40 |
| 3/4 | 1.57 |
| 4/5 | 1.38 |
| 5/6 | 1.38 |

| | RATIOS | 1450 | 1452 | 1454 | 1456 | 1458 |
|---|---|---|---|---|---|---|
| REVERSE | -2.15 | X | X | | | X |
| NEUTRAL | 0.00 | | X | | | X |
| 1 | 2.69 | | X | | X | X |
| 2 | 1.54 | | X | X | | X |
| 3 | 1.00 | | X | X | X | |
| 4 | 0.73 | | | X | X | X |
| 5 | 0.53 | X | | X | | X |
| 6 | 0.38 | X | | | X | X |

(X=engaged)

Ring Gear/Sun Gear Tooth Ratios: $\frac{R1}{S1}=2.75, \frac{R2}{S2}=2.01, \frac{R3}{S3}=2.15$

| Ratio Spread | 6.99 |
|---|---|
| Ratio Steps | |
| REV/1 | -0.80 |
| 1/2 | 1.75 |
| 2/3 | 1.54 |
| 3/4 | 1.36 |
| 4/5 | 1.37 |
| 5/6 | 1.39 |

| | RATIOS | 1550 | 1552 | 1554 | 1556 | 1558 |
|---|---|---|---|---|---|---|
| REVERSE | -1.41 | | X | | X | X |
| NEUTRAL | 0.00 | | X | | | X |
| 1 | 2.25 | | X | X | | X |
| 2 | 1.44 | X | X | | | X |
| 3 | 1.00 | X | X | X | | |
| 4 | 0.68 | X | X | | X | |
| 5 | 0.54 | X | | X | X | |
| 6 | 0.40 | | X | X | X | |

(X=engaged)

Ring Gear/Sun Gear Tooth Ratios: $\frac{R1}{S1}=1.51, \frac{R2}{S2}=1.81, \frac{R3}{S3}=2.25$

| Ratio Spread | 5.65 |
|---|---|
| Ratio Steps | |
| REV/1 | -0.63 |
| 1/2 | 1.56 |
| 2/3 | 1.44 |
| 3/4 | 1.46 |
| 4/5 | 1.26 |
| 5/6 | 1.36 |

|  | RATIOS | 1650 | 1652 | 1654 | 1656 | 1658 |
|---|---|---|---|---|---|---|
| REVERSE | -1.15 |  |  | X | X | X |
| NEUTRAL | 0.00 |  |  | X |  | X |
| 1 | 2.12 | X |  | X |  | X |
| 2 | 1.46 | X |  | X | X |  |
| 3 | 1.00 | X | X | X |  |  |
| 4 | 0.61 | X | X |  | X |  |
| 5 | 0.51 | X | X |  |  | X |
| 6 | 0.39 |  | X | X |  | X |

( X=engaged )

Ring Gear/Sun Gear Tooth Ratios: $\frac{R1}{S1}=1.75, \frac{R2}{S2}=2.50, \frac{R3}{S3}=1.80$

| Ratio Spread | 5.40 |
|---|---|
| Ratio Steps |  |
| REV/1 | -0.54 |
| 1/2 | 1.45 |
| 2/3 | 1.46 |
| 3/4 | 1.57 |
| 4/5 | 1.24 |
| 5/6 | 1.30 |

| | RATIOS | 1750 | 1752 | 1754 | 1756 | 1758 |
|---|---|---|---|---|---|---|
| REVERSE | -1.97 | X | X | | X | |
| NEUTRAL | 0.00 | X | X | | | |
| 1 | 2.32 | X | X | | | X |
| 2 | 1.44 | X | | X | | X |
| 3 | 1.00 | X | X | X | | |
| 4 | 0.73 | | X | X | | X |
| 5 | 0.51 | | X | X | X | |
| 6 | 0.40 | | | X | X | X |

( X=engaged )

Ring Gear/Sun Gear Tooth Ratios: $\frac{R1}{S1}=2.57, \frac{R2}{S2}=2.25, \frac{R3}{S3}=1.65$

| Ratio Spread | 5.74 |
|---|---|
| Ratio Steps | |
| REV/1 | -0.85 |
| 1/2 | 1.61 |
| 2/3 | 1.44 |
| 3/4 | 1.36 |
| 4/5 | 1.44 |
| 5/6 | 1.26 |

| | RATIOS | 1850 | 1852 | 1854 | 1856 | 1858 |
|---|---|---|---|---|---|---|
| REVERSE | -1.14 | | X | | X | X |
| NEUTRAL | 0.00 | | X | | X | |
| 1 | 2.19 | X | X | | X | |
| 2 | 1.49 | X | X | | | X |
| 3 | 1.00 | X | X | X | | |
| 4 | 0.63 | | X | X | | X |
| 5 | 0.50 | X | | X | | X |
| 6 | 0.38 | | | X | X | X |

(X=engaged)

Ring Gear/Sun Gear Tooth Ratios: $\frac{R1}{S1}=1.51, \frac{R2}{S2}=1.63, \frac{R3}{S3}=3.01$

| Ratio Spread | 5.76 |
|---|---|
| Ratio Steps | |
| REV/1 | -0.52 |
| 1/2 | 1.47 |
| 2/3 | 1.49 |
| 3/4 | 1.59 |
| 4/5 | 1.24 |
| 5/6 | 1.33 |

| | RATIOS | 1950 | 1952 | 1954 | 1956 | 1958 |
|---|---|---|---|---|---|---|
| REVERSE | -1.63 | X | X | | | X |
| NEUTRAL | 0.00 | | X | | | X |
| 1 | 2.31 | | X | | X | X |
| 2 | 1.53 | | X | X | | X |
| 3 | 1.00 | | X | X | X | |
| 4 | 0.71 | | | X | X | X |
| 5 | 0.48 | X | | X | | X |
| 6 | 0.36 | X | | | X | X |

(X=engaged)

Ring Gear/Sun Gear Tooth Ratios: $\frac{R1}{S1} = 2.50, \frac{R2}{S2} = 1.75, \frac{R3}{S3} = 1.63$

| Ratio Spread | 6.41 |
|---|---|
| Ratio Steps | |
| REV/1 | -0.70 |
| 1/2 | 1.51 |
| 2/3 | 1.53 |
| 3/4 | 1.40 |
| 4/5 | 1.50 |
| 5/6 | 1.32 |

SIX SPEED PLANETARY TRANSMISSION MECHANISMS WITH THREE INTERCONNECTED GEARSETS

TECHNICAL FIELD

This invention relates to multi-speed power transmissions and, more particularly, to multi-speed power transmissions having at least six forward speed ranges and incorporating three planetary gearsets.

BACKGROUND OF THE INVENTION

Passenger vehicles include a powertrain that is comprised of an engine, multi-speed transmission, and a differential or final drive mechanism. The multi-speed transmission increases the overall operating range of the vehicle by permitting the engine to operate through its torque range a number of times as the transmission ratios are interchanged. The number of forward speed ratios that are available in a transmission determines the number of ratio interchanges that can occur and therefore the number of times the engine torque range can be repeated.

Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978; U.S. Pat. No. 5,106,352 issued to Lepelletier on Apr. 21, 1992; U.S. Pat. No. 5,599,251 issued to Beim and McCarrick on Feb. 4, 1997, U.S. Pat. No. 6,071,208 issued to Koivunen on Jun. 6, 2000; U.S. Pat. No. 6,083,135 issued to Baldwin et al. on Jul. 4, 2000, and European Patent Application No. EP 1 033 510 A1 published Jun. 9, 2000.

Six speed transmissions offer several advantages over four and five speed transmissions, including improved vehicle acceleration and improved fuel economy. While many trucks employ six-speed transmissions, such as Polak, passenger cars are still manufactured, for the main part, with three and four speed automatic transmissions, and relatively few five or six speed devices due to the size and complexity of these transmissions. The Polak transmission provides six forward speed ratios with three planetary gearsets, two clutches, and three brakes. The Koivunen and Beim patents utilize six torque transmitting devices including four brakes and two clutches to establish the six forward speed ratios and one reverse ratio. The Lepelletier and the EP publications each employ three planetary gearsets, three clutches and two brakes to provide six forward speed ratios and one reverse ratio. One of the planetary gearsets in each of these publications is positioned and operated to establish two fixed speed input members for the remaining two planetary gearsets.

SUMMARY OF THE INVENTION

It is an object of this invention to provide an improved multi-speed power transmission having at least six forward speed ratios and one reverse speed ratio.

In one aspect of the present invention, each of the multi-speed transmissions incorporates three continuously interconnected planetary gearsets and each of the gearsets having three planetary gear members; namely, a sun gear member, a ring gear member, and a planet carrier assembly member.

In another aspect of the present invention, a first member of the first gearset is continuously interconnected with a first member of the second gearset, and a second member of the second gearset is continuously interconnected with a first member of the third gearset.

In still another aspect of the present invention, each of the multi-speed transmissions has at least one gear member continuously interconnected with an input shaft and another gear member continuously interconnected with a transmission output shaft.

In yet another aspect of the present invention, each of the multi-speed transmission mechanisms has five torque-transmitting mechanisms, which consist of either three rotating type torque-transmitting mechanisms, and two stationary type torque-transmitting mechanisms, or four rotating type torque-transmitting mechanisms and one stationary type torque-transmitting mechanism.

In a further aspect of the present invention, the torque-transmitting mechanisms are engaged in combinations of three to provide the six forward speed ratios and one reverse speed ratio.

The present invention defines low-content six speed transmission mechanisms having three planetary gearsets and five selectively engageable torque-transmitting mechanisms. Each of the three planetary gearsets has three members in which a first member of the first planetary gearset is continuously interconnected with a first member of the second planetary gearset, and a second member of the second planetary gearset is continuously interconnected with a first member of the third planetary gearset. The input shaft and the output shaft of the transmission are continuously connected with members of the planetary gearsets.

The first of the torque-transmitting mechanisms connects a member of the first or second planetary gearset with a member of the third planetary gearset. A second of the torque-transmitting mechanisms connects a member of the second or third planetary gearset with another member of the first, second, or third planetary gearset. A third of the torque-transmitting mechanisms selectively interconnects a member of the first or third planetary gearset or one of the interconnecting members with another member of one of the planetary gearsets. A fourth of the selectively engageable torque-transmitting mechanisms selectively interconnects a member of one of the planetary gearsets with a stationary member, such as a transmission housing. A fifth of the torque-transmitting mechanisms selectively interconnects a member of one of the planetary gearsets with another member of one of the planetary gearsets or with the stationary member of the transmission.

By selectively engaging the five torque-transmitting mechanisms in combinations of three, it is possible to provide at least six forward speed ratios and one reverse speed ratio between the input shaft and the output shaft of the transmission.

DESCRIPTION OF THE EXEMPLARY EMBODIMENTS

Figures 1, 2:
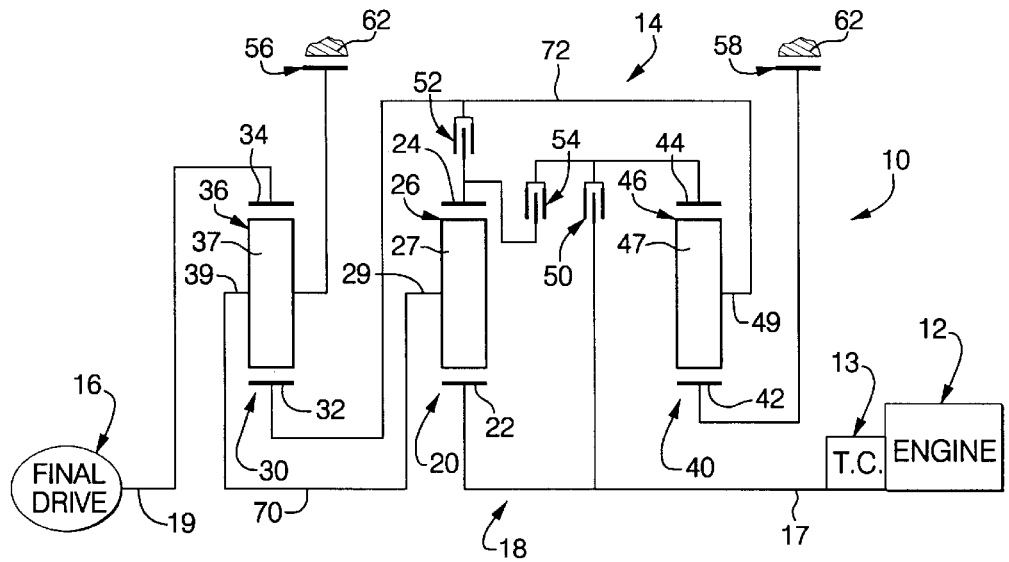
FIG. 1 is a schematic representation of a powertrain having a transmission incorporating one embodiment of the present invention.
FIG. 2 is a truth table and chart providing some of the operating characteristics of the powertrain shown in FIG. 1.

Referring to the drawings, wherein like characters represent the same or corresponding parts throughout the several views, there is seen in FIG. 1 a powertrain 10 having a conventional engine 12, a conventional starting device 13, a planetary transmission 14, and a conventional final drive mechanism 16. The final drive mechanism 16 is connected with vehicle drive wheels, not shown. The planetary transmission 14 includes an input shaft 17, a planetary gear arrangement 18, and an output shaft 19. The input shaft 17 is continuously interconnected with the starting device 13, and the output shaft 19 is continuously interconnected with the final drive mechanism 16.

The planetary gear arrangement 18 includes three simple planetary gearsets 20, 30, and 40, and five selectively engageable torque-transmitting mechanisms 50, 52, 54, 56, and 58. The torque-transmitting mechanisms 50, 52, and 54 are rotating type torque-transmitting mechanisms, and the torque-transmitting mechanisms 56 and 58 are stationary type torque-transmitting mechanisms. The torque-transmitting mechanisms are conventional fluid-operated friction devices, such as clutches and brakes. The design and construction of these mechanisms is well known in the art.

The planetary gearset 20 includes a sun gear member 22, a ring gear member 24, and a planet carrier assembly member 26. The planet carrier assembly member 26 includes a plurality of pinion gear members 27 that are rotatably mounted on a planet carrier member 29 and disposed in meshing relationship with both the sun gear member 22 and the ring gear member 24. While the schematic representation shows a single pinion gear member, it is well known in the art that the pinion gear members are equiangularly spaced on the planet carrier member 29 to distribute the torque loading which is transmitted by the planetary gearset.

The planetary gearset 30 includes a sun gear member 32, a ring gear member 34, and a planet carrier assembly member 36. The planet carrier assembly member 36 includes a plurality of pinion gear members 37 that are rotatably mounted on a planet carrier member 39 and disposed in meshing relationship with both the sun gear member 32 and the ring gear member 34.

The planetary gearset 40 includes a sun gear member 42, a ring gear member 44, and a planet carrier assembly member 46. The planet carrier assembly member 46 includes a plurality of pinion gear members 47 that are rotatably mounted on a planet carrier member 49 and disposed in meshing relationship with both the sun gear member 42 and the ring gear member 44. Each of the planetary gearsets 20, 30, and 40 are of the category defined as simple planetary gearsets wherein when the planet carrier member is held stationary the sun gear member and the ring gear member will rotate in opposite directions when one of those members is driven.

The input shaft 17 is continuously interconnected with the sun gear member 22, and selectively interconnectible with the ring gear member 44 through the torque-transmitting mechanism 50. The output shaft 19 is continuously interconnected with the ring gear member 34. The planet carrier assembly member 26 is continuously interconnected with the planet carrier assembly member 36 through an interconnecting member 70. The sun gear member 32 and the planet carrier assembly member 46 are continuously interconnected by an interconnecting member 72. Whenever the planet carrier assembly members are defined as being interconnected with another transmission member, that connection is by way of the planet carrier member of each of the planet carrier assembly members.

The ring gear member 24 is selectively interconnectible with the interconnecting member 72 through the torque-transmitting mechanism 52, and selectively interconnectible with the ring gear member 44 through the torque-transmitting mechanism 54. The interconnecting member 70 is selectively connectible with a transmission housing 62 through the torque-transmitting mechanism 56. The sun gear member 42 is selectively interconnectible with the transmission housing 62 through the torque-transmitting mechanism 58.

As seen in the truth table of FIG. 2, the torque-transmitting mechanisms are selectively engaged in combinations of three to establish six forward speed ratios and one reverse speed ratio. Upon reviewing the truth table, those skilled in the art will recognize that each of the ratio interchanges in the forward direction are of the single transition variety, that is, only one torque-transmitting mechanism is interchanged or swapped when a ratio change is accomplished. Also given in the truth table is a numerical value of the speed ratios that are available with the planetary gear arrangement 18 when the ring gear/sun gear tooth ratios of the planetary gearsets 30, 20, and 40 are as given in FIG. 2 as R1/S1, R2/S2, and R3/S3, respectively. The chart of FIG. 2 provides the numerical value for the ratio steps between adjacent forward speed ratios as well as between the reverse and first forward speed ratio, and the numerical value of the overall ratio spread of the forward speed ratios. These numerical values are determined from the numerical values of the speed ratios given in the truth table.

The reverse speed ratio is established with the engagement of the torque-transmitting mechanisms 50, 56, and 58. During the reverse speed ratio, the planet carrier assembly member 46 and sun gear member 32 are rotated at a speed determined by the speed of the ring gear member 44 and the ring gear/sun gear tooth ratio of the planetary gearset 40. The ring gear member 34 and therefore output shaft 19 are rotated at a speed determined by the speed of the sun gear member 32 and the ring gear/sun gear tooth ratio of the planetary gearset 30. The numerical value of the reverse speed ratio is determined by the ring gear/sun gear tooth ratios of the planetary gearsets 40 and 30.

The first forward speed ratio is established with the engagement of the torque-transmitting mechanisms 54, 56, and 58. It should be noted that the reverse-to-forward interchange only requires the swapping of the torque-transmitting mechanisms 50 and 54. During the first forward speed ratio, the ring gear members 24 and 44 are rotated at a speed determined by the speed of the sun gear member 22 and the ring gear/sun gear tooth ratio of the planetary gearset 20. The planet carrier assembly member 46 and sun gear member 32 are rotated at a speed determined by the speed of the ring gear member 44 and the ring gear/sun gear tooth ratio of the planetary gearset 40. The ring gear member 34 and therefore output shaft 19 are rotated at a speed determined by the speed of the sun gear member 32 and the ring gear/sun gear tooth ratio of the planetary gearset 30. The numerical value of the first forward speed ratio is determined by the ring gear/sun gear tooth ratios of all three planetary gearsets 20, 30, and 40.

The second forward speed ratio is established with the engagement of the torque-transmitting mechanisms 52, 54, and 56. During the second forward speed ratio, the ring gear member 24 and sun gear member 32 are rotated at a speed determined by the speed of the sun gear member 22 and the ring gear/sun gear tooth ratio of the planetary gearset 20. The ring gear member 34 and therefore output shaft 19 are rotated at a speed determined by the speed of the sun gear member 32 and the ring gear/sun gear tooth ratio of the planetary gearset 30. The numerical value of the second forward speed ratio is determined by the ring gear/sun gear tooth ratios of the planetary gearsets 20 and 30.

The third forward speed ratio is established with the engagement of the torque-transmitting mechanisms 52, 54, and 58. During the third forward speed ratio, the planet carrier assembly members 26 and 36 are rotated at a speed determined by the speed of the sun gear member 22 and the ring gear/sun gear tooth ratio of the planetary gearset 20. The ring gear member 34 and therefore output shaft 19 are rotated at a speed determined by the speed of the planet carrier assembly member 36 and the ring gear/sun gear tooth ratio of the planetary gearset 30. The numerical value of the third forward speed ratio is determined by the ring gear/sun gear tooth ratios of the planetary gearsets 20 and 30.

The fourth forward speed ratio is established with the engagement of the torque-transmitting mechanisms 50, 52, and 58. During the fourth forward speed ratio, the planet carrier assembly member 46, ring gear member 24, and sun gear member 32 are rotated at a speed determined by the speed of the ring gear member 44 and the ring gear/sun gear tooth ratio of the planetary gearset 40. The planet carrier assembly members 26 and 36 are rotated at a speed determined by the speed of the sun gear member 22, the speed of the ring gear member 24, and the ring gear/sun gear tooth ratio of the planetary gearset 20. The ring gear member 34 and therefore output shaft 19 are rotated at a speed determined by the speed of the sun gear member 32, the speed of the planet carrier assembly member 36, and the ring gear/sun gear tooth ratio of the planetary gearset 30. The numerical value of the fourth forward speed ratio is determined by the ring gear/sun gear tooth ratios of all three planetary gearsets 20, 30, and 40.

The fifth forward speed ratio is established with the engagement of the torque-transmitting mechanisms 50, 52, and 54. During the fifth forward speed ratio, the planetary gearsets 20, 30, and 40 are rotated in unison with the input shaft 17 and the output shaft 19. The numerical value of the fifth forward speed ratio is one.

The sixth forward speed ratio is established with the engagement of the torque-transmitting mechanisms 50, 54, and 58. During the sixth forward speed ratio, the planet carrier assembly members 26 and 36 are rotated in unison with the input shaft 17. The planet carrier assembly member 46 and sun gear member 32 are rotated at a speed determined by the speed of the ring gear member 44 and the ring gear/sun gear tooth ratio of the planetary gearset 40. The ring gear member 34 and therefore output shaft 19 are rotated at a speed determined by the speed of the planet carrier assembly member 36, the speed of the sun gear member 32, and the ring gear/sun gear tooth ratio of the planetary gearset 30. The numerical value of the sixth forward speed ratio is determined by the ring gear/sun gear tooth ratios of the planetary gearsets 30 and 40.

Figures 3, 4:
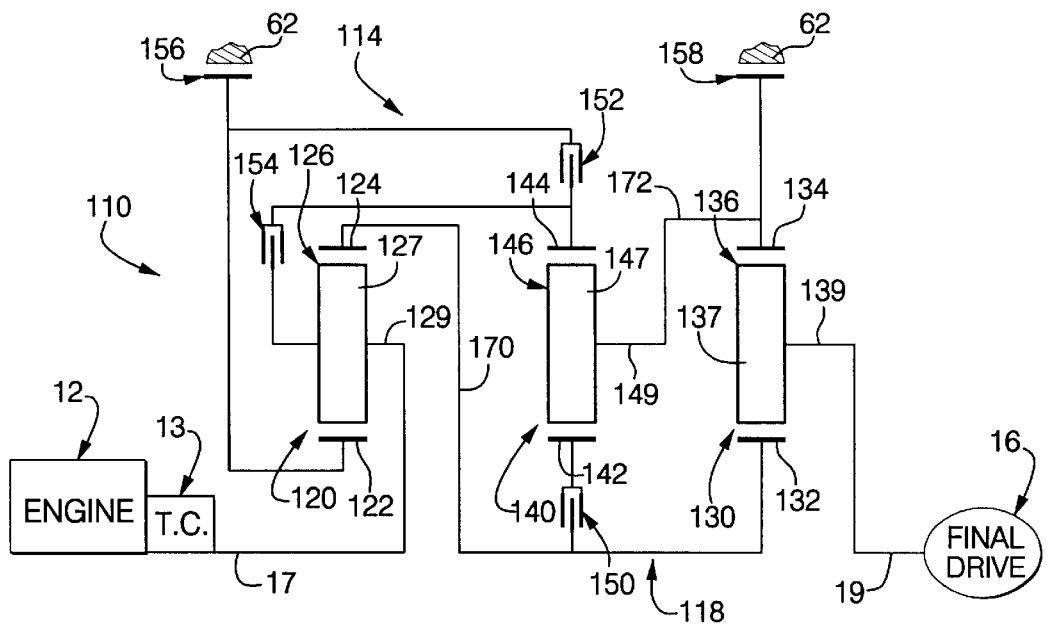
FIG. 3 is a schematic representation of a powertrain having a transmission incorporating another embodiment of the present invention.
FIG. 4 is a truth table and chart providing some of the operating characteristics of the powertrain shown in FIG. 3.

A powertrain 110, shown in FIG. 3, includes the engine 12, the starting device 13, a planetary transmission 114, and the final drive mechanism 16. The planetary transmission 114 includes the input shaft 17, a planetary gear arrangement 118, and the output shaft 19. The planetary gear arrangement 118 includes three simple planetary gearsets 120, 130, and 140, three rotating type torque-transmitting mechanisms 150, 152, and 154, and two stationary type torque-transmitting mechanisms 156 and 158.

The planetary gearset 120 includes a sun gear member 122, a ring gear member 124, and a planet carrier assembly member 126. The planet carrier assembly member 126 includes a plurality of pinion gear members 127 that are rotatably mounted on a planet carrier member 129 and disposed in meshing relationship with the sun gear member 122 and the ring gear member 124.

The planetary gearset 130 includes a sun gear member 132, a ring gear member 134, and a planet carrier assembly member 136. The planet carrier assembly member 136 includes a plurality of pinion gear members 137 that are rotatably mounted on a planet carrier member 139 and disposed in meshing relationship with the sun gear member 132 and the ring gear member 134.

The planetary gearset 140 includes a sun gear member 142, a ring gear member 144, and a planet carrier assembly member 146. The planet carrier assembly member 146 includes a plurality of pinion gear members 147 that are rotatably mounted on a planet carrier member 149 and disposed in meshing relationship with the sun gear member 142 and the ring gear member 144.

The input shaft 17 is continuously interconnected with the planet carrier assembly member 126, and selectively interconnectible with the ring gear member 144 through the torque-transmitting mechanism 154. The ring gear member 124 and sun gear member 132 are continuously interconnected by an interconnecting member 170, which is selectively connectible with the sun gear member 142 through the torque-transmitting mechanism 150. The planet carrier assembly member 146 and ring gear member 134 are continuously interconnected by an interconnecting member 172, which is selectively connectible with the transmission housing 62 through the torque-transmitting mechanism 158. The planet carrier assembly member 136 is continuously interconnected with the output shaft 19. The sun gear member 122 is selectively interconnectible with the ring gear member 144 through the torque-transmitting mechanism 152, and selectively connectible with the transmission housing 62 through the torque-transmitting mechanism 156.

As seen in the truth table of FIG. 4, the torque-transmitting mechanisms are engaged in combinations of three to establish six forward speed ratios and one reverse speed ratio between the input shaft 17 and the output shaft 19. The truth table of FIG. 4 also provides a numerical example for speed ratios that are available with the planetary gear arrangement 118. These numerical values are determined utilizing the ring gear/sun gear tooth ratios of the planetary gearsets 120, 140, and 130 when the ring gear/sun gear tooth ratios are as given as R1/S1, R2/S2, and R3/S3, respectively. The chart of FIG. 4 provides a numerical representation of the ratio steps between adjacent forward speed ratios, the reverse and first forward speed ratio, as well as the overall ratio spread of the forward speed ratios. These numerical values are, of course, determined from the speed ratio values given in the truth table.

The reverse speed ratio is established with the engagement of the torque-transmitting mechanisms 150, 154, and 158. During the reverse speed ratio, the sun gear members 142 and 132 are rotated at a speed determined by the speed of the ring gear member 144 and the ring gear/sun gear tooth ratio of the planetary gearset 140. The planet carrier assembly member 136 and therefore output shaft 19 are rotated at a speed determined by the speed of the sun gear member 132 and the ring gear/sun gear tooth ratio of the planetary gearset 130. The numerical value of the reverse speed ratio is determined by the ring gear/sun gear tooth ratios of the planetary gearsets 130 and 140.

The first forward speed ratio is established with the engagement of the torque-transmitting mechanisms 152, 154, and 158. During the first forward speed ratio, the planetary gearset 120 and sun gear member 132 are rotated in unison with the input shaft 17. The planet carrier assembly member 136 and therefore output shaft 19 are rotated at a speed determined by the speed of the sun gear member 132 and the ring gear/sun gear tooth ratio of the planetary gearset 130. The numerical value of the first forward speed ratio is determined by the ring gear/sun gear tooth ratio of the planetary gearset 130.

The second forward speed ratio is established with the engagement of the torque-transmitting mechanisms 152, 156, and 158. During the second forward speed ratio, the ring gear member 124 and sun gear member 132 are rotated at a speed determined by the speed of the planet carrier assembly member 126 and the ring gear/sun gear tooth ratio of the planetary gearset 120. The planet carrier assembly member 136 and therefore output shaft 19 are rotated at a speed determined by the speed of the sun gear member 132 and the ring gear/sun gear tooth ratio of the planetary gearset 130. The numerical value of the second forward speed ratio is determined by the ring gear/sun gear tooth ratios of the planetary gearsets 120 and 130.

The third forward speed ratio is established with the engagement of the torque-transmitting mechanisms 150, 152, and 158. During the third forward speed ratio, the ring gear member 144 and sun gear member 122 are rotated at a speed determined by the speed of the sun gear member 142 and the ring gear/sun gear tooth ratio of the planetary gearset 140. The ring gear member 124, sun gear member 132, and sun gear member 142 are rotated at a speed determined by the speed of the planet carrier assembly member 126, the speed of the sun gear member 122, and the ring gear/sun gear tooth ratio of the planetary gearset 120. The planet carrier assembly member 136 and therefore output shaft 19 are rotated at a speed determined by the speed of the sun gear member 132 and the ring gear/sun gear tooth ratio of the planetary gearset 130. The numerical value of the third forward speed ratio is determined by the ring gear/sun gear tooth ratios of all three planetary gearsets 120, 130, and 140.

The fourth forward speed ratio is established with the engagement of the torque-transmitting mechanisms 150, 152, and 156. During the fourth forward speed ratio, the ring gear member 124, sun gear member 132, and sun gear member 142 are rotated at a speed determined by the speed of the planet carrier assembly member 126 and the ring gear/sun gear tooth ratio of the planetary gearset 120. The planet carrier assembly member 146 and ring gear member 134 are rotated at a speed determined by the speed of the sun gear member 142 and the ring gear/sun gear tooth ratio of the planetary gearset 140. The planet carrier assembly member 136 and therefore output shaft 19 are rotated at a speed determined by the speed of the sun gear member 132, the speed of the ring gear member 134, and the ring gear/sun gear tooth ratio of the planetary gearset 130. The numerical value of the fourth forward speed ratio is determined by the ring gear/sun gear tooth ratios of all three planetary gearsets 120, 130, and 140.

The fifth forward speed ratio is established with the engagement of the torque-transmitting mechanisms 150, 152, and 154. During the fifth forward speed ratio, the planetary gearsets 120, 130, and 140 are rotated in unison with the input shaft 17 and the output shaft 19. The numerical value of the fifth forward speed ratio is one.

The sixth forward speed ratio is established with the engagement of the torque-transmitting mechanisms 150, 154, and 156. During the sixth forward speed ratio, the ring gear member 124, sun gear member 132, and sun gear member 142 are rotated at a speed determined by the speed of the planet carrier assembly member 126 and the ring gear/sun gear tooth ratio of the planetary gearset 120. The planet carrier assembly member 146 and ring gear member 134 are rotated at a speed determined by the speed of the sun gear member 142, the speed of the ring gear member 144, and the ring gear/sun gear tooth ratio of the planetary gearset 140. The planet carrier assembly member 136 and therefore output shaft 19 are rotated at a speed determined by the speed of the sun gear member 132, the speed of the ring gear member 134, and the ring gear/sun gear tooth ratio of the planetary gearset 130. The numerical value of the sixth forward speed ratio is determined by the ring gear/sun gear tooth ratios of all three planetary gearsets 120, 130, and 140.

Figures 5, 6:
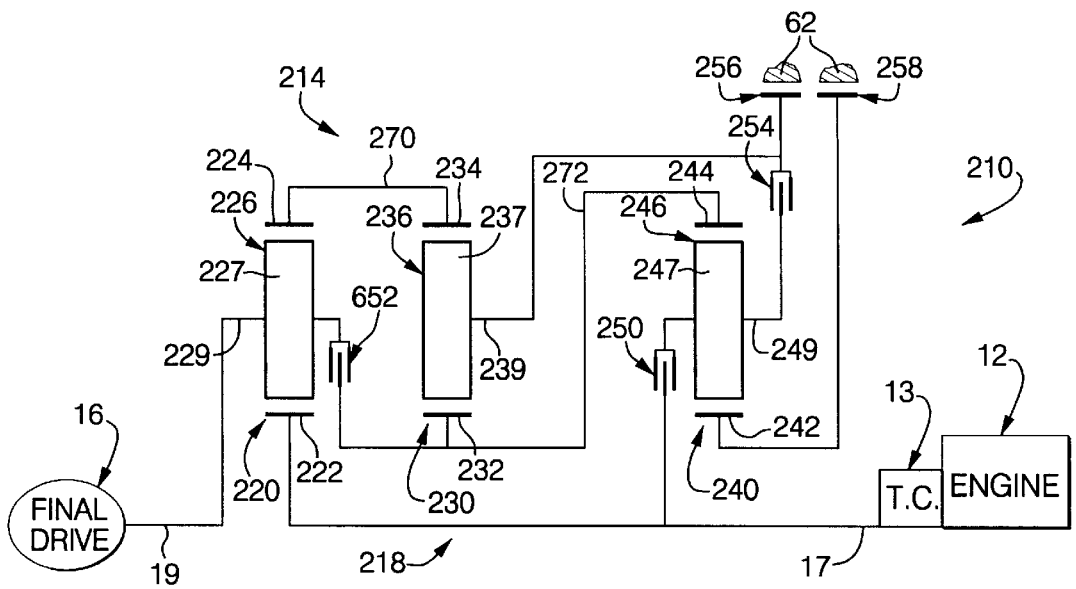
FIG. 5 is a schematic representation of a powertrain having a transmission incorporating another embodiment of the present invention.
FIG. 6 is a truth table and chart providing some of the operating characteristics of the powertrain shown in FIG. 5.

A powertrain 210, shown in FIG. 5, includes the engine 12, the starting device 13, a planetary transmission 214, and the final drive mechanism 16. The planetary transmission 214 includes the input shaft 17, a planetary gear arrangement 218, and the output shaft 19. The planetary gear arrangement 218 includes three simple planetary gearsets 220, 230, and 240, three rotating type torque-transmitting mechanisms 250, 252, and 254, and two stationary type torque-transmitting mechanisms 256 and 258.

The planetary gearset 220 includes a sun gear member 222, a ring gear member 224, and a planet carrier assembly member 226. The planet fly carrier assembly member 226 includes a plurality of pinion gear members 227 that are rotatably mounted on a planet carrier member 229 and disposed in meshing relationship with the sun gear member 222 and the ring gear member 224.

The planetary gearset 230 includes a sun gear member 232, a ring gear member 234, and a planet carrier assembly member 236. The planet carrier assembly member 236 includes a plurality of pinion gear members 237 that are rotatably mounted on a planet carrier member 239 and disposed in meshing relationship with the sun gear member 232 and the ring gear member 234.

The planetary gearset 240 includes a sun gear member 242, a ring gear member 244, and a planet carrier assembly member 246. The planet carrier assembly member 246 includes a plurality of pinion gear members 247 that are rotatably mounted on a planet carrier member 249 and disposed in meshing relationship with the sun gear member 242 and the ring gear member 244.

The input shaft 17 is continuously interconnected with the sun gear member 222, and selectively interconnectible with the planet carrier assembly member 246 through the torque-transmitting mechanism 250. The output shaft 19 is continuously interconnected with the planet carrier assembly member 226.

The ring gear members 224 and 234 are continuously interconnected by an interconnecting member 270. The sun gear member 232 and ring gear member 244 are continuously interconnected by an interconnecting member 272, which is selectively connectible with the output shaft 19 through the torque-transmitting mechanism 252. The planet carrier assembly member 236 is selectively interconnectible with the planet carrier assembly member 246 through the torque-transmitting mechanism 254, and selectively interconnectible with the transmission housing 62 through the torque-transmitting mechanism 256. The sun gear member 242 is selectively interconnectible with the transmission housing 62 through the torque-transmitting mechanism 258.

The torque-transmitting mechanisms are selectively engageable in combinations of three, as seen in the truth table of FIG. 6, to establish six forward speed ratios and one reverse speed ratio between the input shaft 17 and the output shaft 19. Also given in the truth table of FIG. 6 is a numerical example of the speed ratios that are available with the planetary gear arrangement 218 when the ring gear/sun gear tooth ratios of the planetary gearsets 220, 230, and 240 are selected as shown as R1/S1, R2/S2, and R3/S3, respectively. Also provided in FIG. 6 is a numerical example of the ratio steps between adjacent forward speed ratios and the reverse and the first forward speed ratio, as well as the overall ratio spread of the forward speed ratios. These numerical values are determined from the speed ratio values given in the truth table of FIG. 6.

The reverse speed ratio is established with the engagement of the torque-transmitting mechanisms 250, 256, and 258. During the reverse speed ratio, the ring gear member 244 and sun gear member 232 are rotated at a speed determined by the speed of the planet carrier assembly member 246 and the ring gear/sun gear tooth ratio of the planetary gearset 240. The ring gear members 234 and 224 are rotated at a speed determined by the speed of the sun gear member 232 and the ring gear/sun gear tooth ratio of the planetary gearset 230. The planet carrier assembly member 226 and therefore output shaft 19 are rotated at a speed determined by the speed of the sun gear member 222, the speed of the ring gear member 224, and the ring gear/sun gear tooth ratio of the planetary gearset 220. The numerical value of the reverse speed ratio is determined by the ring gear/sun gear tooth ratios of all three planetary gearsets 220, 230, and 240.

The first forward speed ratio is established with the engagement of the torque-transmitting mechanisms 252, 254, and 256. During the first forward speed ratio, the ring gear members 224 and 234 are rotated at a speed determined by the speed of the sun gear member 222, the speed of the planet carrier assembly member 226, and the ring gear/sun gear tooth ratio of the planetary gearset 220. The sun gear member 232, planet carrier assembly member 226 and therefore output shaft 19 are rotated at a speed determined by the speed of the ring gear member 234 and the ring gear/sun gear tooth ratio of the planetary gearset 230. The numerical value of the first forward speed ratio is determined by the ring gear/sun gear tooth ratios of the planetary gearsets 220 and 230.

The second forward speed ratio is established with the engagement of the torque-transmitting mechanisms 254, 256, and 258. During the second forward speed ratio, the planet carrier assembly member 226 and therefore output shaft 19 are rotated at a speed determined by the speed of the sun gear member 222 and the ring gear/sun gear tooth ratio of the planetary gearset 220. The numerical value of the second forward speed ratio is determined by the ring gear/sun gear tooth ratio of the planetary gearset 220.

The third forward speed ratio is established with the engagement of the torque-transmitting mechanisms 252, 254, and 258. During the third forward speed ratio, the ring gear members 224 and 234 are rotated at a speed determined by the speed of the sun gear member 222, the speed of the planet carrier assembly member 226, and the ring gear/sun gear tooth ratio of the planetary gearset 220. The planet carrier assembly members 236 and 246 are rotated at a speed determined by the speed of the ring gear member 234, the speed of the sun gear member 232, and the ring gear/sun gear tooth ratio of the planetary gearset 230. The ring gear member 244, sun gear member 232, and planet carrier assembly member 226, and output shaft 19 are rotated at a speed determined by the speed of the planet carrier assembly member 246 and the ring gear/sun gear tooth ratio of the planetary gearset 240. The numerical value of the third forward speed ratio is determined by the ring gear/sun gear tooth ratios of all three planetary gearsets 220, 230, and 240.

The fourth forward speed ratio is established with the engagement of the torque-transmitting mechanisms 250, 254, and 258. During the fourth forward speed ratio, the ring gear member 244 and sun gear member 232 are rotated at a speed determined by the speed of the planet carrier assembly member 246 and the ring gear/sun gear tooth ratio of the planetary gearset 240. The ring gear members 234 and 224 are rotated at a speed determined by the speed of the sun gear member 232, the speed of the planet carrier assembly member 236, and the ring gear/sun gear tooth ratio of the planetary gearset 230. The planet carrier assembly member 226 and output shaft 19 are rotated at a speed determined by the speed of the sun gear member 222, the speed of the ring gear member 224, and the ring gear/sun gear tooth ratio of the planetary gearset 220. The numerical value of the fourth forward speed ratio is determined by the ring gear/sun gear tooth ratios of all three planetary gearsets 220, 230, and 240.

The fifth forward speed ratio is established with the engagement of the torque-transmitting mechanisms 250, 252, and 254. During the fifth forward speed ratio, the planetary gearsets 240, 230 and 220 are rotated in unison with the input shaft 17 and the output shaft 19. The numerical value of the fifth forward speed ratio is one.

The sixth forward speed ratio is established with the engagement of the torque-transmitting mechanisms 250, 252, and 258. During the sixth forward speed ratio, the ring gear member 244, sun gear member 232, planet carrier assembly member 226, and output shaft 19 are rotated at a speed determined by the speed of the planet carrier assembly member 246 and the ring gear/sun gear tooth ratio of the planetary gearset 240. The numerical value of the sixth forward speed ratio is determined by the ring gear/sun gear tooth ratio of the planetary gearset 240.

Figures 7, 8:
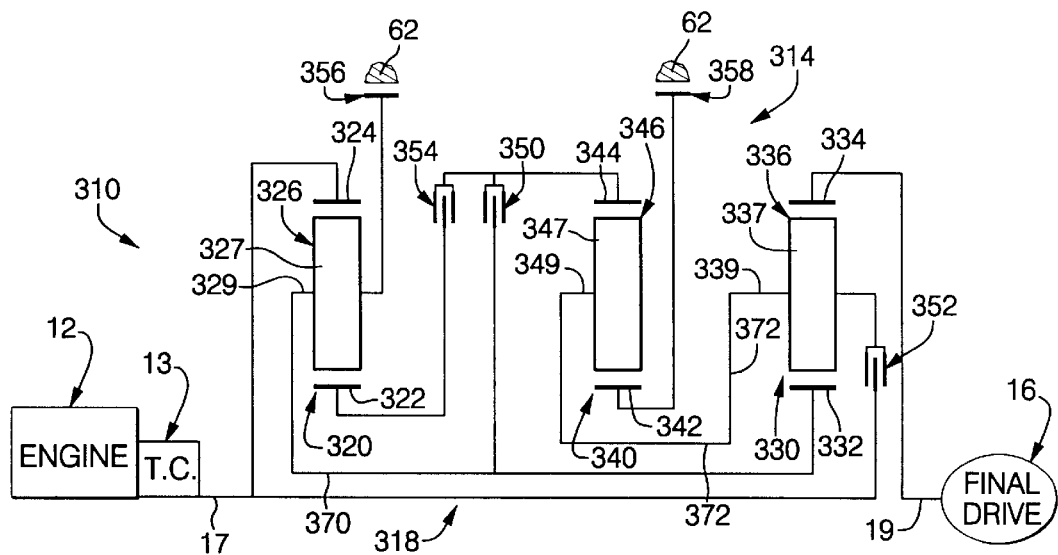
FIG. 7 is a schematic representation of a powertrain having a transmission incorporating another embodiment of the present invention.
FIG. 8 is a truth table and chart providing some of the operating characteristics of the powertrain shown in FIG. 7.

A powertrain 310, shown in FIG. 7, includes the engine 12, the starting device 13, a planetary transmission 314, and the final drive mechanism 16. The planetary transmission 314 includes the input shaft 17, a planetary gear arrangement 318, and the output shaft 19. The planetary gear arrangement 318 includes three simple planetary gearsets 320, 330, and 340, three rotating type torque-transmitting mechanisms 350, 352, and 354, and two stationary type torque-transmitting mechanisms 356 and 358.

The planetary gearset 320 includes a sun gear member 322, a ring gear member 324, and a planet carrier assembly member 326. The planet carrier assembly member 326 includes a plurality of pinion gear members 327 that are rotatably mounted on a planet carrier member 329 and disposed in meshing relationship with the sun gear member 322 and the ring gear member 324.

The planetary gearset 330 includes a sun gear member 332, a ring gear member 334, and a planet carrier assembly member 336. The planet carrier assembly member 336 includes a plurality of pinion gear members 337 that are rotatably mounted on a planet carrier member 339 and disposed in meshing relationship with the sun gear member 332 and the ring gear member 334.

The planetary gearset 340 includes a sun gear member 342, a ring gear member 344, and a planet carrier assembly member 346. The planet carrier assembly member 346 includes a plurality of pinion gear members 347 that are rotatably mounted on a planet carrier member 349 and disposed in meshing relationship with the sun gear member 342 and the ring gear member 344.

The input shaft 17 is continuously interconnected with the ring gear member 324. The output shaft 19 is continuously interconnected with the ring gear member 334. The planet carrier assembly member 326 and sun gear member 332 are continuously interconnected by an interconnecting member 370, which is selectively connectible with the ring gear member 344 through the torque-transmitting mechanism 350. The planet carrier assembly member 346 and planet carrier assembly member 336 are continuously interconnected by an interconnecting member 372, which is selectively connectible with the input shaft 17 through the torque-transmitting mechanism 352.

The sun gear member 322 is selectively interconnectible with the ring gear member 344 through the torque-transmitting mechanism 354, and selectively interconnectible with the transmission housing 62 through the torque-transmitting mechanism 356. The sun gear member 342 is selectively interconnectible with the transmission housing 62 through the torque-transmitting mechanism 358.

The torque-transmitting mechanisms are selectively engageable in combinations of three, as shown in the truth table of FIG. 8, to establish six forward speed ratios and one reverse speed ratio between the input shaft 17 and the output shaft 19. Also shown in the truth table of FIG. 8 is a numerical example of the speed ratios that are available in the planetary gear arrangement 318 when the ring gear/sun gear tooth ratios of the planetary gearsets 320, 340, and 330 are as shown in FIG. 8 as R1/S1, R2/S2, and R3/S3, respectively. The chart in FIG. 8 provides a numerical value for each of the ratio steps between the reverse and first forward speed ratio, between the adjacent forward speed ratios, and the overall ratio spread of the forward speed ratios. These numerical values are determined from the speed ratio values given in the truth table of FIG. 8.

The reverse speed ratio is established with the engagement of the torque-transmitting mechanisms 354, 356, and 358. During the reverse speed ratio, the planet carrier assembly member 326 and sun gear member 332 are rotated at a speed determined by the speed of the ring gear member 324 and the ring gear/sun gear tooth ratio of the planetary gearset 320. The ring gear member 334 and therefore output shaft 19 are rotated at a speed determined by the speed of the sun gear member 332 and the ring gear/sun gear tooth ratio of the planetary gearset 330. The numerical value of the reverse speed ratio is determined by the ring gear/sun gear tooth ratios of the planetary gearsets 320 and 330.

The first forward speed ratio is established with the engagement of the torque-transmitting mechanisms 350, 356, and 358. During the first forward speed ratio, the planet carrier assembly member 326, ring gear member 344, and sun gear member 332 are rotated at a speed determined by the speed of the ring gear member 324 and the ring gear/sun gear tooth ratio of the planetary gearset 320. The planet carrier assembly members 346 and 336 are rotated at a speed determined by the speed of the ring gear member 344 and the ring gear/sun gear tooth ratio of the planetary gearset 340. The ring gear member 334 and output shaft 19 are rotated at a speed determined by the speed of the sun gear member 332, the speed of the planet carrier assembly member 336, and the ring gear/sun gear tooth ratio of the planetary gearset 330. The numerical value of the first forward speed ratio is determined by the ring gear/sun gear tooth ratios of all three planetary gearsets 320, 330, and 340.

The second forward speed ratio is established with the engagement of the torque-transmitting mechanisms 350, 354, and 358. During the second forward speed ratio, the planet carrier assembly members 346 and 336 are rotated at a speed determined by the speed of the ring gear member 344 and the ring gear/sun gear tooth ratio of the planetary gearset 340. The ring gear member 334 and therefore output shaft 19 are rotated at a speed determined by the speed of the sun gear member 332, the speed of the planet carrier assembly member 336, and the ring gear/sun gear tooth ratio of the planetary gearset 330. The numerical value of the second forward speed ratio is determined by the ring gear/sun gear tooth ratios of the planetary gearsets 330 and 340.

The third forward speed ratio is established with the engagement of the torque-transmitting mechanisms 350, 352, and 358. During the third forward speed ratio, the ring gear member 344, planet carrier assembly member 326, and sun gear member 332 are rotated at a speed determined by the speed of the planet carrier assembly member 346 and the ring gear/sun gear tooth ratio of the planetary gearset 340. The ring gear member 334 and therefore output shaft 19 are rotated at a speed determined by the speed of the planet carrier assembly member 336, the speed of the sun gear member 332, and the ring gear/sun gear tooth ratio of the planetary gearset 330. The numerical value of the third forward speed ratio is determined by the ring gear/sun gear tooth ratios of the planetary gearsets 330 and 340.

The fourth forward speed ratio is established with the engagement of the torque-transmitting mechanisms 352, 354, and 358. During the fourth forward speed ratio, the ring gear member 344 and sun gear member 322 are rotated at a speed determined by the speed of the planet carrier assembly member 346 and the ring gear/sun gear tooth ratio of the planetary gearset 340. The planet carrier assembly member 326 and sun gear member 332 are rotated at a speed determined by the speed of the ring gear member 324, the speed of the sun gear member 322, and the ring gear/sun gear tooth ratio of the planetary gearset 320. The ring gear member 334 and output shaft 19 are rotated at a speed determined by the speed of the planet carrier assembly member 336, the speed of the sun gear member 332, and the ring gear/sun gear tooth ratio of the planetary gearset 330. The numerical value of the fourth forward speed ratio is determined by the ring gear/sun gear tooth ratios of all three planetary gearsets 320, 330, and 340.

The fifth forward speed ratio is established with the engagement of the torque-transmitting mechanisms 350, 352, and 354. During the fifth forward speed ratio, the planetary gearsets 320, 330, and 340 are rotated in unison with the input shaft 17 and the output shaft 19. The numerical value of the fifth forward speed ratio is one.

The sixth forward speed ratio is established with the engagement of the torque-transmitting mechanisms 352, 354, and 356. During the sixth forward speed ratio, the planet carrier assembly member 326 and sun gear member 332 are rotated at a speed determined by the speed of the ring gear member 324 and the ring gear/sun gear tooth ratio of the planetary gearset 320. The ring gear member 334 and output shaft 19 are rotated at a speed determined by the speed of the planet carrier assembly member 336, the speed of the sun gear member 332, and the ring gear/sun gear tooth ratio of the planetary gearset 330. The numerical value of the sixth forward speed ratio is determined by the ring gear/sun gear tooth ratios of the planetary gearsets 320 and 330.

Figures 9, 10:
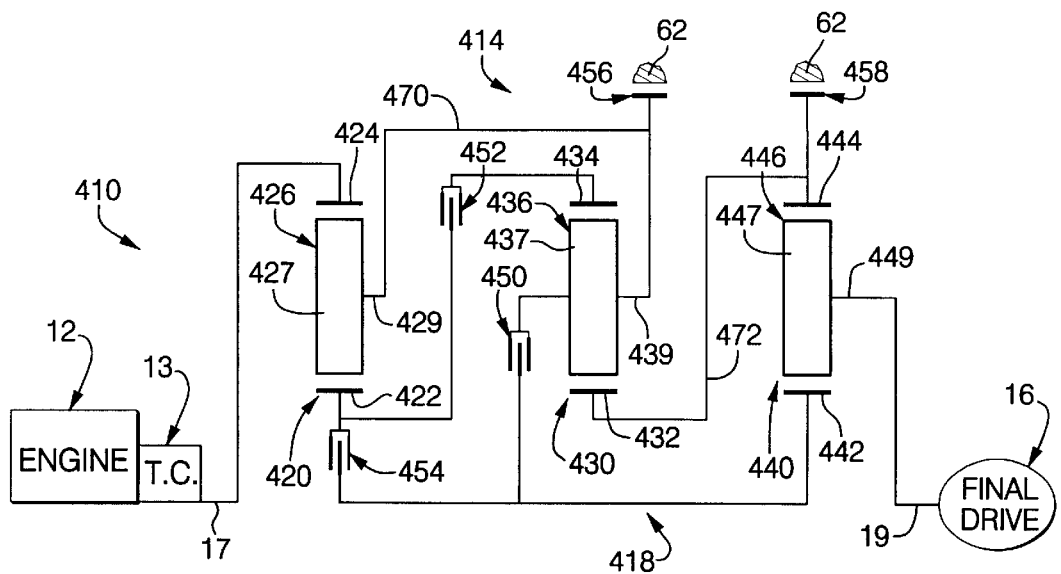
FIG. 9 is a schematic representation of a powertrain having a transmission incorporating another embodiment of the present invention.
FIG. 10 is a truth table and chart providing some of the operating characteristics of the powertrain shown in FIG. 9.

A powertrain 410, shown in FIG. 9, includes the engine 12, the starting device 13, a planetary transmission 414, and the final drive mechanism 16. The planetary transmission 414 includes the input shaft 17, a planetary gear arrangement 418, and the output shaft 19. The planetary gear arrangement 418 includes three simple planetary gearsets 420, 430, and 440, three rotating type torque-transmitting mechanisms 450, 452, and 454, and two stationary type torque-transmitting mechanisms 456 and 458.

The planetary gearset 420 includes a sun gear member 422, a ring gear member 424, and a planet carrier assembly member 426. The planet carrier assembly member 426 includes a plurality of pinion gear members 427 that are rotatably mounted on a planet carrier member 429 and disposed in meshing relationship with the sun gear member 422 and the ring gear member 424.

The planetary gearset 430 includes a sun gear member 432, a ring gear member 434, and a planet carrier assembly member 436. The planet carrier assembly member 436 includes a plurality of pinion gear members 437 that are rotatably mounted on a planet carrier member 439 and disposed in meshing relationship with the sun gear member 432 and the ring gear member 434.

The planetary gearset 440 includes a sun gear member 442, a ring gear member 444, and a planet carrier assembly member 446. The planet carrier assembly member 446 includes a plurality of pinion gear members 447 that are rotatably mounted on a planet carrier member 449 and disposed in meshing relationship with the sun gear member 442 and the ring gear member 444.

The input shaft 17 is continuously connected between the starting device 13 and the ring gear member 424. The output shaft 19 is continuously connected between the planet carrier assembly member 446 and the final drive mechanism 16. The planet carrier assembly member 426 and the planet carrier assembly member 436 are continuously interconnected by an interconnecting member 470. The sun gear member 432 and ring gear member 444 are continuously interconnected by an interconnecting member 472.

The interconnecting member 470 and sun gear member 442 are selectively interconnected with the torque-transmitting mechanism 450. The sun gear member 422 is selectively interconnectible with the ring gear member 434 through the torque-transmitting mechanism 452, and selectively interconnectible with the sun gear member 442 through the torque-transmitting mechanism 454. The interconnecting member 470 is selectively connectible with the transmission housing 62 through the torque-transmitting mechanism 456. The interconnecting member 472 is selectively interconnectible with the transmission housing 62 through the torque-transmitting mechanism 458.

The truth table of FIG. 10 describes the engagement sequence and combinations for the torque-transmitting mechanisms in order to establish six forward speed ratios and one reverse speed ratio between the input shaft 17 and the output shaft 19. Also shown in the truth table is a numerical example for each of the speed ratios. These numerical examples are determined utilizing the ring gear/sun gear tooth ratios of the planetary gearsets 420, 430, and 440, which are shown in FIG. 10 as R1/S1, R2/S2, and R3/S3, respectively. The chart in FIG. 10 provides the numerical value for the ratio steps between adjacent forward speed ratios and between the reverse and first forward speed ratio, as well as the overall ratio spread of the forward speed ratios. These numerical values are determined from the speed ratios given in the truth table.

The reverse speed ratio is established with the engagement of the torque-transmitting mechanisms 454, 456, and 458. During the reverse speed ratio, the sun gear members 422 and 442 are rotated at a speed determined by the speed of the ring gear member 424 and the ring gear/sun gear tooth ratio of the planetary gearset 420. The planet carrier assembly member 446 and therefore output shaft 19 are rotated at a speed determined by the speed of the speed of the sun gear member 442 and the ring gear/sun gear tooth ratio of the planetary gearset 440. The numerical value of the reverse speed ratio is determined by the ring gear/sun gear tooth ratios of the planetary gearsets 420 and 440.

The first forward speed ratio is established with the engagement of the torque-transmitting mechanisms 450, 454, and 458. During the first forward speed ratio, the sun gear member 442 is effectively connected directly with the input shaft 17. The planet carrier assembly member 446 and therefore output shaft 19 are rotated at a speed determined by the speed of the sun gear member 442 and the ring gear/sun gear tooth ratio of the planetary gearset 440. The numerical value of the first forward speed ratio is determined by the ring gear/sun gear tooth ratio of the planetary gearset 440.

The second forward speed ratio is established with the engagement of the torque-transmitting mechanisms 450, 452, and 458. During the second forward speed ratio, the sun gear member 422 and ring gear member 434 are rotated at a speed determined by the speed of the ring gear member 424, the speed of the planet carrier assembly member 426, and the ring gear/sun gear tooth ratio of the planetary gearset 420. The planet carrier assembly member 426, planet carrier assembly member 436, and sun gear member 442 are rotated at a speed determined by the speed of the ring gear member 434 and the ring gear/sun gear tooth ratio of the planetary gearset 430. The planet carrier assembly member 446 and therefore output shaft 19 are rotated at a speed determined by the speed of the sun gear member 442 and the ring gear/sun gear tooth ratio of the planetary gearset 440. The numerical value of the second forward speed ratio is determined cry by the ring gear/sun gear tooth ratios of all three planetary gearsets 420, 430, and 440.

The third forward speed ratio is established with the engagement of the torque-transmitting mechanisms 452, 454, and 458. During the third forward speed ratio, the planet carrier assembly members 426 and 436 are rotated at a speed determined by the speed of the ring gear member 424, the speed of the sun gear member 422, and the ring gear/sun gear tooth ratio of the planetary gearset 420. The ring gear member 434, sun gear member 422, and sun gear member 442 are rotated at a speed determined by the speed of the planet carrier assembly member 436 and the ring gear/sun gear tooth ratio of the planetary gearset 430. The planet carrier assembly member 446 and output shaft 19 are rotated at a speed determined by the speed of the sun gear member 442 and the ring gear/sun gear tooth ratio of the planetary gearset 440. The numerical value of the third forward speed ratio is determined by the ring gear/sun gear tooth ratios of all three planetary gearsets 420, 430, and 440.

The fourth forward speed ratio is established with the engagement of the torque-transmitting mechanisms 450, 452, and 454. During the fourth forward speed ratio, the planetary gearsets 420, 430, and 440 are rotated in unison with the input shaft 17 and the output shaft 19. The numerical value of the fourth forward speed ratio is one.

The fifth forward speed ratio is established with the engagement of the torque-transmitting mechanisms 452, 454, and 456. During the fifth forward speed ratio, the sun gear member 422, ring gear member 434, and sun gear member 442 are rotated at a speed determined by the speed of the ring gear member 424 and the ring gear/sun gear tooth ratio of the planetary gearset 420. The sun gear member 432 and ring gear member 444 are rotated at a speed determined by the speed of the ring gear member 434 and the ring gear/sun gear tooth ratio of the planetary gearset 430. The planet carrier assembly member 446 and therefore output shaft 19 are rotated at a speed determined by the speed of the sun gear member 442, the speed of the ring gear member 444, and the ring gear/sun gear tooth ratio of the planetary gearset 440. The numerical value of the fifth forward speed ratio is determined by the ring gear/sun gear tooth ratios of all three planetary gearsets 420, 430, and 440.

The sixth forward speed ratio is established with the engagement of the torque-transmitting mechanisms 450, 452, and 456. During the sixth forward speed ratio, the sun gear member 422 and ring gear member 434 are rotated at a speed determined by the speed of the ring gear member 424 and the ring gear/sun gear tooth ratio of the planetary gearset 420. The sun gear member 432 and ring gear member 444 are rotated at a speed determined by the speed of the ring gear member 434 and the ring gear/sun gear tooth ratio of the planetary gearset 430. The planet carrier assembly member 446 and therefore output shaft 19 are rotated at a speed determined by the speed of the ring gear member 444 and the ring gear/sun gear tooth ratio of the planetary gearset 440. The numerical value of the sixth forward speed ratio is determined by the ring gear/sun gear tooth ratios of all three planetary gearsets 420, 430, and 440.

Figures 11, 12:
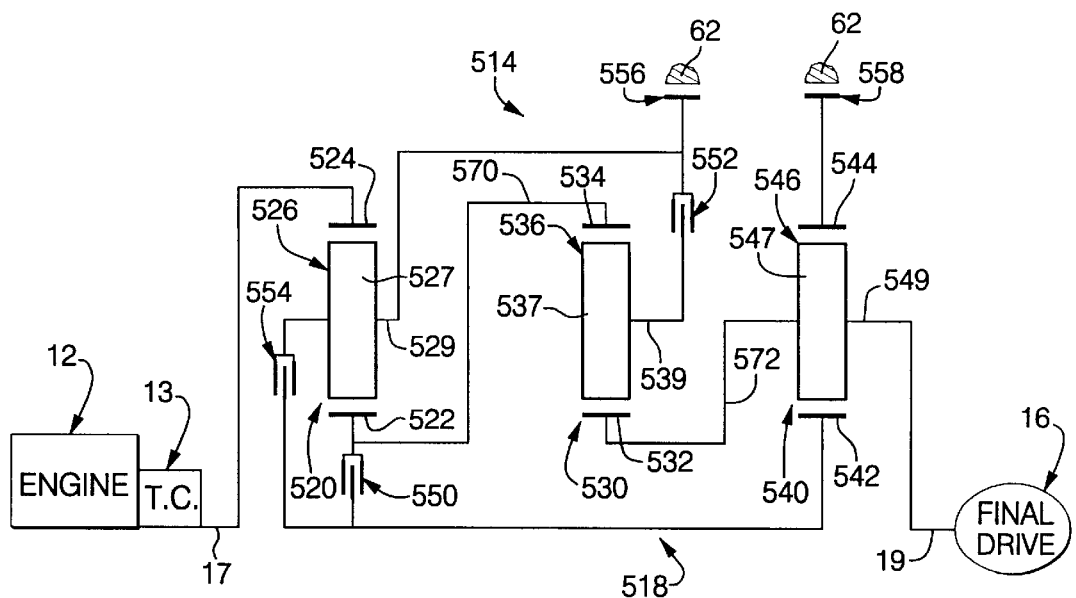
FIG. 11 is a schematic representation of a powertrain having a transmission incorporating another embodiment of the present invention.
FIG. 12 is a truth table and chart providing some of the operating characteristics of the powertrain shown in FIG. 11.

A powertrain 510, shown in FIG. 11, includes the engine 12, the starting device 13, a planetary transmission 514, and the final drive mechanism 16. The planetary transmission 514 includes the input shaft 17, a planetary gear arrangement 518, and the output shaft 19. The planetary gear arrangement 518 includes three simple planetary gearsets 520, 530, and 540, three rotating type torque-transmitting mechanisms 550, 552, and 554, and two stationary type torque-transmitting mechanisms 556 and 558.

The planetary gearset 520 includes a sun gear member 522, a ring gear member 524, and a planet carrier assembly member 526. The planet carrier assembly member 526 includes a plurality of pinion gear members 527 that are rotatably mounted on a planet carrier member 529 and disposed in meshing relationship with the sun gear member 522 and the ring gear member 524.

The planetary gearset 530 includes a sun gear member 532, a ring gear member 534, and a planet carrier assembly member 536. The planet carrier assembly member 536 includes a plurality of pinion gear members 537 that are rotatably mounted on a planet carrier member 539 and disposed in meshing relationship with the sun gear member 532 and the ring gear member 534.

The planetary gearset 540 includes a sun gear member 542, a ring gear member 544, and a planet carrier assembly member 546. The planet carrier assembly member 546 includes a plurality of pinion gear members 547 that are rotatably mounted on a planet carrier member 549 and disposed in meshing relationship with the sun gear member 542 and the ring gear member 544.

The input shaft 17 is continuously interconnected between the starting device 13 and the ring gear member 524. The output shaft 19 is continuously interconnected between the planet carrier assembly member 546 and the final drive mechanism 16. The sun gear member 522 and ring gear member 534 are continuously interconnected by an interconnecting member 570. The sun gear member 532 and ring gear member 544 are continuously interconnected by an interconnecting member 572.

The interconnecting member 570 is selectively interconnectible with the sun gear member 542 through the torque-transmitting mechanism 550. The planet carrier assembly member 526 is selectively interconnectible with the planet carrier assembly member 536 through the torque-transmitting mechanism 552, selectively interconnectible with the sun gear member 542 through the torque-transmitting mechanism 554, and selectively interconnectible with the transmission housing 62 through the torque-transmitting mechanism 556. The interconnecting member 572 is selectively interconnectible with the transmission housing 62 through the torque. transmitting mechanism 558.

The torque-transmitting mechanisms are selectively engaged in combinations of three, as shown in the truth table of FIG. 12, to establish six forward speed ratios and one reverse speed ratio between the input shaft 17 and the output shaft 19. The truth table also provides a numerical example of the speed ratios that are available with the planetary gear arrangement 518 when the ring gear/sun gear tooth ratios of the planetary gearsets 520, 530, and 540 are given as R1/S1, R2/S2, and R3/S3, respectively. Also shown in FIG. 12 is a numerical example of the ratio steps between the reverse and first forward speed ratio, between the adjacent forward speed ratios, and the overall ratio spread of the forward speed ratios. These numerical values are determined from the speed ratio values given in the truth table.

The reverse speed ratio is established with the engagement of the torque-transmitting mechanisms 550, 556, and 558. During the reverse speed ratio, the sun gear members 522 and 542 are rotated at a speed determined by the speed of the ring gear member 524 and the ring gear/sun gear tooth ratio of the planetary gearset 520. The planet carrier assembly member 546 and therefore output shaft 19 are rotated at a speed determined by the speed of the sun gear member 542 and the ring gear/sun gear tooth ratio of the planetary gearset 540. The numerical value of the reverse speed ratio is determined by the ring gear/sun gear tooth ratios of the planetary gearsets 520 and 540.

The first forward speed ratio is established with the engagement of the torque-transmitting mechanisms 550, 554, and 558. During the first forward speed ratio, the sun gear member 542 is driven in unison with the input shaft 17. The planet carrier assembly member 546 and therefore output shaft 19 are rotated at a speed determined by the speed of the sun gear member 542 and the ring gear/sun gear tooth ratio of the planetary gearset 540. The numerical value of the first forward speed ratio is determined by the ring gear/sun gear tooth ratio of the planetary gearset 540.

The second forward speed ratio is established with the engagement of the torque-transmitting mechanisms 552, 554, and 558. During the second forward speed ratio, the sun gear member 522 and ring gear member 534 are rotated at a speed determined by the speed of the ring gear member 524, the speed of the planet carrier assembly member 526, and the ring gear/sun gear tooth ratio of the planetary gearset 520. The planet carrier assembly member 536, planet carrier assembly member 526, and sun gear member 542 are rotated at a speed determined by the speed of the ring gear member 534 and the ring gear/sun gear tooth ratio of the planetary gearset 530. The planet carrier assembly member 546 and therefore output shaft 19 are rotated at a speed determined by the speed of the sun gear member 542 and the ring gear/sun gear tooth ratio of the planetary gearset 540. The numerical value of the second forward speed ratio is determined by the ring gear/sun gear tooth ratios of all three planetary gearsets 520, 530, and 540.

The third forward speed ratio is established with the engagement of the torque-transmitting mechanisms 550, 552, and 558. During the third forward speed ratio, the planet carrier assembly members 526 and 536 are rotated at a speed determined by the speed of the ring gear member 524, the speed of the sun gear member 522, and the ring gear/sun gear tooth ratio of the planetary gearset 520. The ring gear member 534, sun gear member 522, and sun gear member 542 are rotated at a speed determined by the speed of the planet carrier assembly member 536 and the ring gear/sun gear tooth ratio of the planetary gearset 530. The planet carrier assembly member 546 and therefore output shaft 19 are rotated at a speed determined by the speed of the sun gear member 542 and the ring gear/sun gear tooth ratio of the planetary gearset 540. The numerical value of the third forward speed ratio is determined by the ring gear/sun gear tooth ratios of all three planetary gearsets 520, 530, and 540.

The fourth forward speed ratio is established with the engagement of the torque-transmitting mechanisms 550, 552, and 554. During the fourth forward speed ratio, the planetary gearsets 520, 530, and 540 rotate in unison with the input shaft 17 and the output shaft 19. The numerical value of the fourth forward speed ratio is one.

The fifth forward speed ratio is established with the engagement of the torque-transmitting mechanisms 550, 552, and 556. During the fifth forward speed ratio, the sun gear member 522, ring gear member 534, and sun gear member 542 are rotated at a speed determined by the speed of the ring gear member 524 and the ring gear/sun gear tooth ratio of the planetary gearset 520. The sun gear member 532 and ring gear member 544 are rotated at a speed determined by the speed of the ring gear member 534 and the ring gear/sun gear tooth ratio of the planetary gearset 530. The planet carrier assembly member 546 and therefore output shaft 19 are rotated at a speed determined by the speed of the ring gear member 544, the speed of the sun gear member 542, and the ring gear/sun gear tooth ratio of the planetary gearset 540. The numerical value of the fifth forward speed ratio is determined by the ring gear/sun gear tooth ratios of all three planetary gearsets 520, 530, and 540.

The sixth forward speed ratio is established with the engagement of the torque-transmitting mechanisms 552, 554, and 556. During the sixth forward speed ratio, the sun gear member 522 and ring gear member 534 are rotated at a speed determined by the speed of the ring gear member 524 and the ring gear/sun gear tooth ratio of the planetary gearset 520. The sun gear member 532 and ring gear member 544 are rotated at a speed determined by the speed of the ring gear member 534 and the ring gear/sun gear tooth ratio of the planetary gearset 530. The planet carrier assembly member 546 and therefore output shaft 19 are rotated at a speed determined by the speed of the ring gear member 544 and the ring gear/sun gear tooth ratio of the planetary gearset 540. The numerical value of the sixth forward speed ratio is determined by the ring gear/sun gear tooth ratios of all three planetary gearsets 520, 530, and 540.

Figures 13, 14:
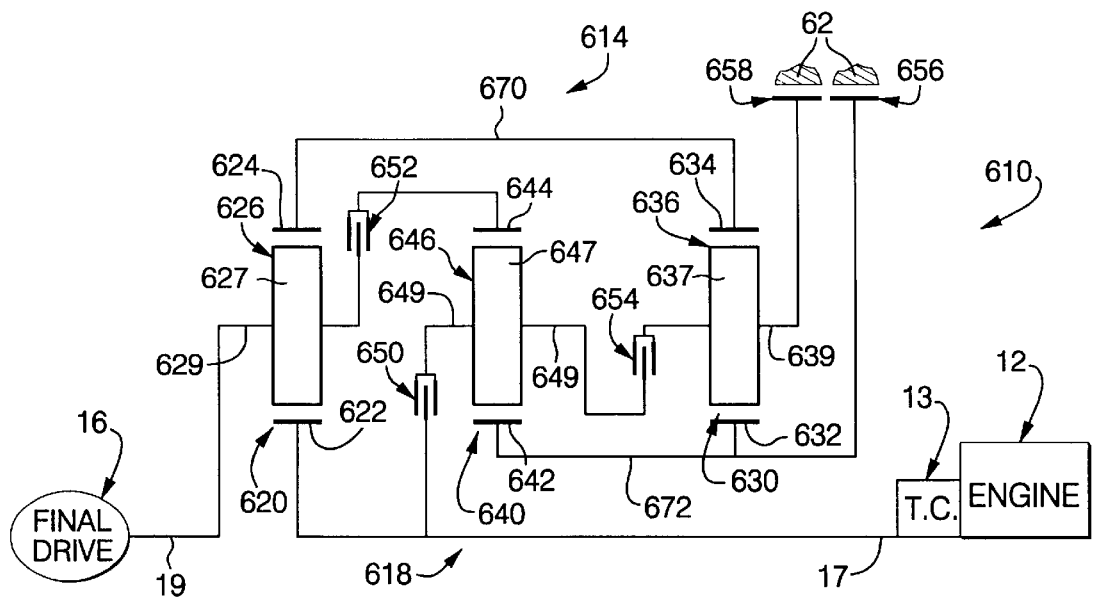
FIG. 13 is a schematic representation of a powertrain having a transmission incorporating another embodiment of the present invention.
FIG. 14 is a truth table and chart providing some of the operating characteristics of the powertrain shown in FIG. 13.

A powertrain 610, shown in FIG. 13, includes the engine 12, the starting device 13, a planetary transmission 614, and the final drive mechanism 16. The planetary transmission 614 includes the input shaft 17, a planetary gear arrangement 618, and the output shaft 19. The planetary gear arrangement 618 includes three simple planetary gearsets 620, 630, and 640, three rotating type torque-transmitting mechanisms 650, 652, and 654, and two stationary type torque-transmitting mechanisms 656 and 658.

The planetary gearset 620 includes a sun gear member 622, a ring gear member 624, and a planet carrier assembly member 626. The planet carrier assembly member 626 includes a plurality of pinion gear members 627 that are rotatably mounted on a planet carrier member 629 and disposed in meshing relationship with the sun gear member 622 and the ring gear member 624.

The planetary gearset 630 includes a sun gear member 632, a ring gear member 634, and a planet carrier assembly member 636. The planet carrier assembly member 636 includes a plurality of pinion gear members 637 that are rotatably mounted on a planet carrier member 639 and disposed in meshing relationship with the sun gear member 632 and the ring gear member 634.

The planetary gearset 640 includes a sun gear member 642, a ring gear member 644, and a planet carrier assembly member 646. The planet carrier assembly member 646 includes a plurality of pinion gear members 647 that are rotatably mounted on a planet carrier member 649 and disposed in meshing relationship with the sun gear member 642 and the ring gear member 644.

The input shaft 17 is continuously interconnected with the sun gear member 622. The output shaft 19 is continuously interconnected with the planet carrier assembly member 626. The sun gear members 632 and 642 are continuously interconnected by an interconnecting member 672. The ring gear members 634 and 624 are continuously interconnected by an interconnecting member 670.

The planet carrier assembly member 646 is selectively interconnectible with the input shaft 17 through the torque-transmitting mechanism 650, and selectively interconnectible with the planet carrier assembly member 636 through the torque-transmitting mechanism 654. The ring gear member 644 is selectively interconnectible with the output shaft 19 through the torque-transmitting mechanism 652. The interconnecting member 672 is selectively connectible with the transmission housing 62 through the torque-transmitting mechanism 656. The planet carrier assembly member 636 is selectively interconnectible with the transmission housing 62 through the torque-transmitting mechanism 658.

The torque-transmitting mechanisms are selectively engageable in combinations of three, as seen in the truth table of FIG. 14, to provide six forward speed ratios and one reverse speed ratio between the input shaft 17 and the output shaft 19. The truth table also provides a numerical example of the speed ratios that are available with the planetary gear arrangement 618 when the ring gear/sun gear tooth ratios of the planetary gearsets 620, 640, and 630 are given as R1/S1, R2/S2, and R3/S3, respectively. Also shown in FIG. 14 is a numerical example of the ratio steps between the reverse and first forward speed ratio, between the adjacent forward speed ratios, and the overall ratio spread of the forward speed ratios. These numerical values are determined from the speed ratio values given in the truth table.

The reverse speed ratio is established with the engagement of the torque-transmitting mechanisms 650, 652, and 658. During the reverse speed ratio, the sun gear members 642 and 632 are rotated at a speed determined by the speed of the planet carrier assembly member 646, the speed of the ring gear member 644, and the ring gear/sun gear tooth ratio of the planetary gearset 640. The ring gear members 634 and 624 are rotated at a speed determined by the speed of the sun gear member 632 and the ring gear/sun gear tooth ratio of the planetary gearset 630. The planet carrier assembly member 626 and therefore output shaft 19 are rotated at a speed determined by the speed of the sun gear member 622, the speed of the ring gear member 624, and the ring gear/sun gear tooth ratio of the planetary gearset 620. The numerical value of the reverse speed ratio is determined by the ring gear/sun gear tooth ratios of all three planetary gearsets 620, 630, and 640.

The first forward speed ratio is established with the engagement of the torque-transmitting mechanisms 654, 656, and 658. During the first forward speed ratio, the ring gear member 624 is effectively connectible with the transmission housing 62. The planet carrier assembly member 626 is rotated at a speed determined by the speed of the sun gear member 622 and the ring gear/sun gear tooth ratio of the planetary gearset 620. The numerical value of the first forward speed ratio is determined by the ring gear/sun gear tooth ratio of the planetary gearset 620.

The second forward speed ratio is established with the engagement of the torque-transmitting mechanisms 652, 654, and 658. During the second forward speed ratio, the ring gear members 624 and 634 are rotated at a speed determined by the speed of the sun gear member 622, the speed of the planet carrier assembly member 626, and the ring gear/sun gear tooth ratio of the planetary gearset 620.

The sun gear members 632 and 642 are rotated at a speed determined by the speed of the ring gear member 634 and the ring gear/sun gear tooth ratio of the planetary gearset 630. The ring gear member 644, planet carrier assembly member 626, and output shaft 19 are rotated at a speed determined by the speed of the sun gear member 642 and the ring gear/sun gear tooth ratio of the planetary gearset 640. The numerical value of the second forward speed ratio is determined by the ring gear/sun gear tooth ratios of all three planetary gearsets 620, 630, and 640.

The third forward speed ratio is established with the engagement of the torque-transmitting mechanisms 652, 654, and 656. During the third forward speed ratio, the ring gear members 624 and 634 are rotated at a speed determined by the speed of the sun gear member 622, the speed of the planet carrier assembly member 626, and the ring gear/sun gear tooth ratio of the planetary gearset 620. The planet carrier assembly members 636 and 646 are rotated at a speed determined by the speed of the ring gear member 634 and the ring gear/sun gear tooth ratio of the planetary gearset 630. The ring gear member 644, planet carrier assembly member 626, and output shaft 19 are rotated at a speed determined by the speed of the planet carrier assembly member 646 and the ring gear/sun gear tooth ratio of the planetary gearset 640. The numerical value of the third forward speed ratio is determined by the ring gear/sun gear tooth ratios of all three planetary gearsets 620, 630, and 640.

The fourth forward speed ratio is established with the engagement of the torque-transmitting mechanisms 650, 652, and 654. During the fourth forward speed ratio, the planetary gearsets 620, 630, and 640 are rotated in unison with the input shaft 17 and the output shaft 19. The numerical value of the fourth forward speed ratio is one.

The fifth forward speed ratio is established with the engagement of the torque-transmitting mechanisms 650, 654, and 656. During the fifth forward speed ratio, the ring gear members 634 and 624 are rotated at a speed determined by the speed of the planet carrier assembly member 636 and the ring gear/sun gear tooth ratio of the planetary gearset 630. The planet carrier assembly member 626 and therefore output shaft 19 are rotated at a speed determined by the speed of the sun gear member 622, the speed of the ring gear member 624, and the ring gear/sun gear tooth ratio of the planetary gearset 620. The numerical value of the fifth forward speed ratio is determined by the ring gear/sun gear tooth ratios of the planetary gearsets 620 and 630.

The sixth forward speed ratio is established with the engagement of the torque-transmitting mechanisms 650, 652, and 656. During the sixth forward speed ratio, the ring gear member 644, planet carrier assembly member 626, and output shaft 19 are rotated at a speed determined by the speed of the planet carrier assembly member 646 and the ring gear/sun gear tooth ratio of the planetary gearset 640. The numerical value of the sixth forward speed ratio is determined by the ring gear/sun gear tooth ratio of the planetary gearset 640.

Figures 15, 16:
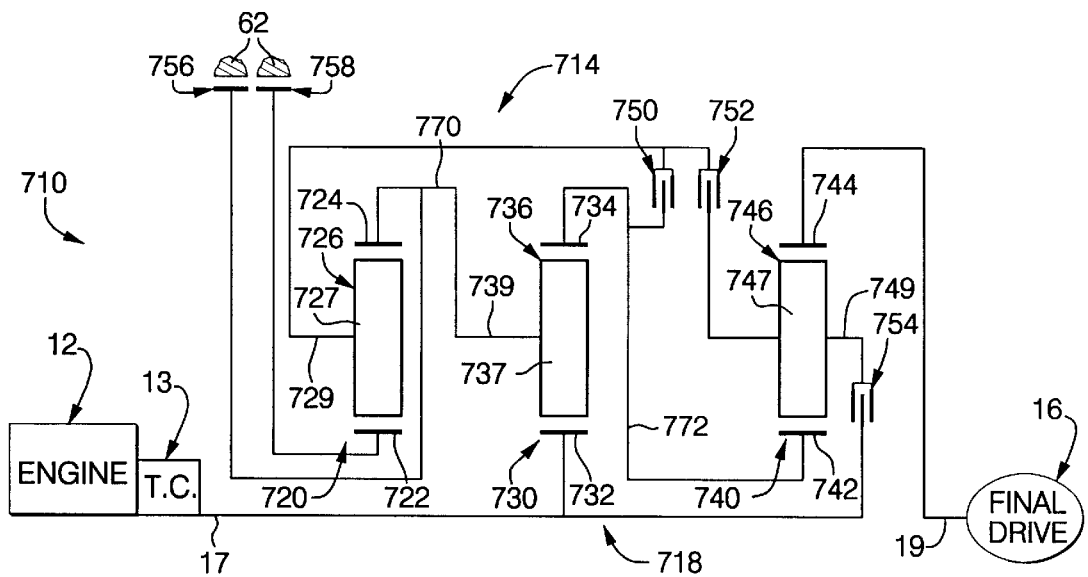
FIG. 15 is a schematic representation of a powertrain having a transmission incorporating another embodiment of the present invention.
FIG. 16 is a truth table and chart providing some of the operating characteristics of the powertrain shown in FIG. 15.

A powertrain 710, shown in FIG. 15, includes the engine 12, the starting device 13, a planetary transmission 714, and the final drive mechanism 16. The planetary transmission 714 includes the input shaft 17, a planetary gear arrangement 718, and the output shaft 19. The planetary gear arrangement 718 includes three simple planetary gearsets 720, 730, and 740, three rotating type torque-transmitting mechanisms 750, 752, and 754, and two stationary type torque-transmitting mechanisms 756 and 758.

The planetary gearset 720 includes a sun gear member 722, a ring gear member 724, and a planet carrier assembly member 726. The planet carrier assembly member 726 includes a plurality of pinion gear members 727 that are rotatably mounted on a planet carrier member 729 and disposed in meshing relationship with the sun gear member 722 and the ring gear member 724.

The planetary gearset 730 includes a sun gear member 732, a ring gear member 734, and a planet carrier assembly member 736. The planet carrier assembly member 736 includes a plurality of pinion gear members 737 that are rotatably mounted on a planet carrier member 739 and disposed in meshing relationship with the sun gear member 732 and the ring gear member 734.

The planetary gearset 740 includes a sun gear member 742, a ring gear member 744, and a planet carrier assembly member 746. The planet carrier assembly member 746 includes a plurality of pinion gear members 747 that are rotatably mounted on a planet carrier member 749 and disposed in meshing relationship with the sun gear member 742 and the ring gear member 744.

The input shaft 17 is continuously interconnected with the sun gear member 732. The output shaft 19 is continuously interconnected with the ring gear member 744. The ring gear member 724 and the planet carrier assembly member 736 are continuously interconnected by an interconnecting member 770. The ring gear member 734 and sun gear member 742 are continuously interconnected by an interconnecting member 772.

The planet carrier assembly member 746 is selectively interconnectible with the input shaft 17 through the torque-transmitting mechanism 754, and selectively interconnectible with the planet carrier assembly member 726 through the torque-transmitting mechanism 752. The planet carrier assembly member 726 is selectively interconnectible with the interconnecting member 772 through the torque-transmitting mechanism 750. The interconnecting member 770 is selectively interconnectible with the transmission housing 62 through the torque-transmitting mechanism 756. The sun gear member 722 is selectively interconnectible with the transmission housing 62 through the torque-transmitting mechanism 758.

The torque-transmitting mechanisms are selectively engaged in combinations of three, as shown in the truth table of FIG. 16, to establish six forward speed ratios and one reverse speed ratio between the input shaft 17 and the output shaft 19. A numerical example for each of these speed ratios is also given in the truth table of FIG. 16. The numerical values given are determined by ring gear/sun gear tooth ratios of the planetary gearsets 720, 730, and 740, which are shown as R1/S1, R2/S2, and R3/S3, respectively, in FIG. 16. The chart in FIG. 16 provides numerical values for the reverse-to-first forward speed ratio step, the speed ratio step between adjacent forward speed ratios, and the overall ratio spread of the forward speed ratios. These numerical values are determined from the speed ratio values given in the truth table.

The reverse speed ratio is established with the engagement of the torque-transmitting mechanisms 750, 752, and 756. During the reverse speed ratio, the ring gear member 734, planetary gearset 740, and output shaft 19 are rotated at a speed determined by the speed of the sun gear member 732 and the ring gear/sun gear tooth ratio of the planetary gearset 730. The numerical value of the reverse speed ratio is determined by the ring gear/sun gear tooth ratio of the planetary gearset 730.

The first forward speed ratio is established with the engagement of the torque-transmitting mechanisms 752, 756, and 758. During the first forward speed ratio, the ring gear member 734 and sun gear member 742 are rotated at a speed determined by the speed of the sun gear member 732 and the ring gear/sun gear tooth ratio of the planetary gearset 730. The ring gear member 744 and therefore output shaft 19 are rotated at a speed determined by the speed of the sun gear member 742 and the ring gear/sun gear tooth ratio of the planetary gearset 740. The numerical value of the first forward speed ratio is determined by the ring gear/sun gear tooth ratios of the planetary gearsets 730 and 740.

The second forward speed ratio is established with the engagement of the torque-transmitting mechanisms 750, 752, and 758. During the second forward speed ratio, the planet carrier assembly member 736 and ring gear member 724 are rotated at a speed determined by the speed of the sun gear member 732, the speed of the ring gear member 734, and the ring gear/sun gear tooth ratio of the planetary gearset 730. The planet carrier assembly member 726, ring gear member 734, planetary gearset 740, and the output shaft 19 are rotated at a speed determined by the speed of the ring gear member 724 and the ring gear/sun gear tooth ratio of the planetary gearset 720. The numerical value of the second forward speed ratio is determined by the ring gear/sun gear tooth ratios of the planetary gearsets 720 and 730.

The third forward speed ratio is established with the engagement of the torque-transmitting mechanisms 752, 754, and 758. During the third forward speed ratio, the ring gear member 724 and planet carrier assembly member 736 are rotated at a speed determined by the speed of the planet carrier assembly member 726 and the ring gear/sun gear tooth ratio of the planetary gearset 720. The ring gear member 734 and sun gear member 742 are rotated at a speed determined by the speed of the sun gear member 732, the speed of the planet carrier assembly member 736, and the ring gear/sun gear tooth ratio of the planetary gearset 730. The ring gear member 744 and therefore output shaft 19 are rotated at a speed determined by the speed of the sun gear member 742, the speed of the planet carrier assembly member 746, and the ring gear/sun gear tooth ratio of the planetary gearset 740. The numerical value of the third forward speed ratio is determined by the ring gear/sun gear tooth ratios of all three planetary gearsets 720, 730, and 740.

The fourth forward speed ratio is established with the engagement of the torque-transmitting mechanisms 750, 752, and 754. During the fourth forward speed ratio, the planetary gearset 740 rotates in unison with the input shaft 17 and the output shaft 19. The numerical value of the fourth forward speed ratio is one.

The fifth forward speed ratio is established with the engagement of the torque-transmitting mechanisms 750, 754, and 758. During the fifth forward speed ratio, the planet carrier assembly member 736 and ring gear member 724 are rotated at a speed determined by the speed of the sun gear member 732, the speed of the ring gear member 734, and the ring gear/sun gear tooth ratio of the planetary gearset 730. The planet carrier assembly member 726, ring gear member 734, and sun gear member 742 are rotated at a speed determined by the speed of the ring gear member 724 and the ring gear/sun gear tooth ratio 720. The ring gear member 744 and therefore output shaft 19 are rotated at a speed determined by the speed of the planet carrier assembly member 746, the speed of the sun gear member 742, and the ring gear/sun gear tooth ratio of the planetary gearset 740. The numerical value of the fifth forward speed ratio is determined by the ring gear/sun gear tooth ratios of all three planetary gearsets 720, 730, and 740.

The sixth forward speed ratio is established with the engagement of the torque-transmitting mechanisms 750, 754, and 756. During the sixth forward speed ratio, the ring gear member 734 and sun gear member 742 are rotated at a speed determined by the speed of the sun gear member 732 and the ring gear/sun gear tooth ratio of the planetary gearset 730. The ring gear member 744 and therefore output shaft 19 are rotated at a speed determined by the speed of the planet carrier assembly member 746, the speed of the sun gear member 742, and the ring gear/sun gear tooth ratio of the planetary gearset 740. The numerical value of the sixth forward speed ratio is determined by the ring gear/sun gear tooth ratios of the planetary gearsets 730 and 740.

Figures 17, 18:
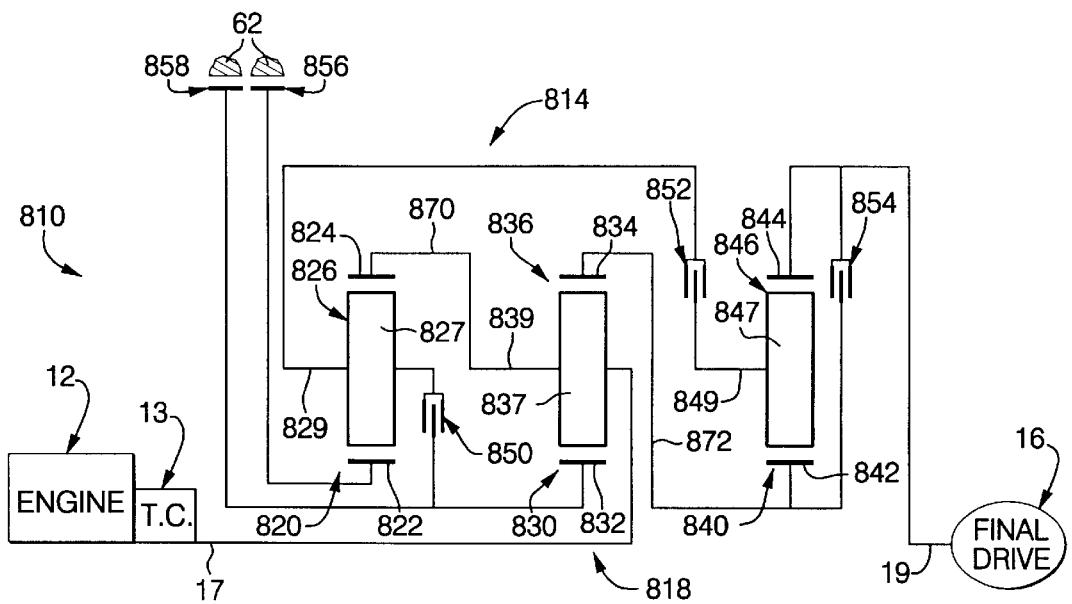
FIG. 17 is a schematic representation of a powertrain having a transmission incorporating another embodiment of the present invention.
FIG. 18 is a truth table and chart providing some of the operating characteristics of the powertrain shown in FIG. 17.

A powertrain 810, shown in FIG. 17, includes the engine 12, the starting device 13, a planetary transmission 814, and the final drive mechanism 16. The planetary transmission 814 includes the input shaft 17, a planetary gear arrangement 818, and the output shaft 19. The planetary gear arrangement 818 includes three simple planetary gearsets 820, 830, and 840, three rotating type torque-transmitting mechanisms 850, 852, and 854, and two stationary type torque-transmitting mechanisms 856 and 858.

The planetary gearset 820 includes a sun gear member 822, a ring gear member 824, and a planet carrier assembly member 826. The planet carrier assembly member 826 includes a plurality of pinion gear members 827 that are rotatably mounted on a planet carrier member 829 and disposed in meshing relationship with the sun gear member 822 and the ring gear member 824.

The planetary gearset 830 includes a sun gear member 832, a ring gear member 834, and a planet carrier assembly member 836. The planet carrier assembly member 836 includes a plurality of pinion gear members 837 that are rotatably mounted on a planet carrier member 839 and disposed in meshing relationship with the sun gear member 832 and the ring gear member 834.

The planetary gearset 840 includes a sun gear member 842, a ring gear member 844, and a planet carrier assembly member 846. The planet carrier assembly member 846 includes a plurality of pinion gear members 847 that are rotatably mounted on a planet carrier member 849 and disposed in meshing relationship with the sun gear member 842 and the ring gear member 844.

The input shaft 17 is continuously connected to an interconnecting member 870, which continuously interconnects a planet carrier assembly member 836 and ring gear member 824. The output shaft 19 is continuously interconnected with the ring gear member 844. The ring gear member 834 and sun gear member 842 are continuously interconnected by an interconnecting member 872, which is selectively interconnectible with the output shaft 19 through the torque-transmitting mechanism 854.

The sun gear member 832 is selectively interconnectible with the planet carrier assembly member 826 through the torque-transmitting mechanism 850, and selectively interconnectible with the transmission housing 62 through the torque-transmitting mechanism 858. The sun gear member 822 is selectively interconnectible with the transmission housing 62 through torque-transmitting mechanism 856. The planet carrier assembly member 826 is selectively interconnectible with the planet carrier assembly member 846 through the torque-transmitting mechanism 852.

As seen in the truth table of FIG. 18, the torque-transmitting mechanisms are selectively engaged in combinations of three to establish six forward speed ratios and one reverse speed ratio between the input shaft 17 and the output shaft 19. Also displayed in the truth table is a numerical value for each of the forward speed ratios and the reverse speed ratio. These numerical values are determined from the ring gear/sun gear tooth ratios of the planetary gearsets 820, 830, and 840, which are shown in FIG. 18 as R1/S1, R2/S2, and R3/S3, respectively. Also shown in FIG. 18 is a chart providing the numerical value for the ratio steps between the reverse and first forward speed ratio, as well as between each of the forward speed ratios, and the overall ratio spread of the forward speed ratios. These numerical values are determined from speed ratio values given in the truth table.

The reverse speed ratio is established with the engagement of the torque-transmitting mechanisms 850, 852, and 858. During the reverse speed ratio, the ring gear member 834 and sun gear member 842 are rotated at a speed determined by the speed of the planet carrier assembly member 836 and the ring gear/sun gear tooth ratio of the planetary gearset 830. The ring gear member 844 and therefore output shaft 19 are rotated at a speed determined by the speed of the sun gear member 842 and the ring gear/sun gear tooth ratio of the planetary gearset 840. The numerical value of the reverse speed ratio is determined by the ring gear/sun gear tooth ratios of the planetary gearsets 830 and 840.

The first forward speed ratio is established with the engagement of the torque-transmitting mechanisms 852, 856, and 858. During the first forward speed ratio, the planet carrier assembly members 826 and 846 are rotated at a speed determined by the speed of the ring gear member 824 and the ring gear/sun gear tooth ratio of the planetary gearset 820. The ring gear A member 834 and sun gear member 842 are rotated at a speed determined by the speed of the planet carrier assembly member 836 and the ring gear/sun gear tooth ratio of the planetary gearset 830. The ring gear member 844 and therefore output shaft 19 are rotated at a speed determined by the speed of the planet carrier assembly member 846, the speed of the sun gear member 842, and the ring gear/sun gear tooth ratio of the planetary gearset 840. The numerical value of the first forward speed ratio is determined by the ring gear/sun gear tooth ratios of all three planetary gearsets 820, 830, and 840.

The second forward speed ratio is established with the engagement of the torque-transmitting mechanisms 850, 852, and 856. During the second forward speed ratio, the planet carrier assembly member 826, sun gear member 832, and planet carrier assembly member 846 are rotated at a speed determined by the speed of the ring gear member 824 and the ring gear/sun gear tooth ratio of the planetary gearset 820. The ring gear member 834 and sun gear member 842 are rotated at a speed determined by the speed of the planet carrier assembly member 836, the speed of the sun gear member 832, and the ring gear/sun gear tooth ratio of the planetary gearset 830. The ring gear member 844 and therefore output shaft 19 are rotated at a speed determined by the speed of the planet carrier assembly member 846, the speed of the sun gear member 842, and the ring gear/sun gear tooth ratio of the planetary gearset 840. The numerical value of the second forward speed ratio is determined by the ring gear/sun gear tooth ratios of all three planetary gearsets 820, 830, and 840.

The third forward speed ratio is established with the engagement of the torque-transmitting mechanisms 852, 854, and 856. During the third forward speed ratio, the planet carrier assembly member 826, planetary gearset 840, and output shaft 19 are rotated at a speed determined by the speed of the ring gear member 824 and the ring gear/sun gear tooth ratio of the planetary gearset 820. The numerical value of the third forward speed ratio is determined by the ring gear/sun gear tooth ratio of the planetary gearset 820.

The fourth forward speed ratio is established with the engagement of the torque-transmitting mechanisms 850, 852, and 854. During the fourth forward speed ratio, the planetary gearsets 830 and 840 rotate in unison with the input shaft 17 and the output shaft 19. The numerical value of the fourth forward speed ratio is one.

The fifth forward speed ratio is established with the engagement of the torque-transmitting mechanisms 850, 854, and 856. During the fifth forward speed ratio, the planet carrier assembly member 826 and sun gear member 832 are rotated at a speed determined by the speed of the ring gear member 824 and the ring gear/sun gear tooth ratio of the planetary gearset 820. The ring gear member 834, planetary gearset 840, and output shaft 19 are rotated at a speed determined by the speed of the planet carrier assembly member 836, the speed of the sun gear member 832, and the ring gear/sun gear tooth ratio of the planetary gearset 830. The numerical value of the fifth forward speed ratio is determined by the ring gear/sun gear tooth ratios of the planetary gearsets 820 and 830.

The sixth forward speed ratio is established with the engagement of the torque-transmitting mechanisms 850, 854, and 858. During the sixth forward speed ratio, the ring gear member 834, planetary gearset 840, and output shaft 19 are rotated at a speed determined by the speed of the planet carrier assembly member 836 and the ring gear/sun gear tooth ratio of the planetary gearset 830. The numerical value of the sixth forward speed ratio is determined by the ring gear/sun gear tooth ratio of the planetary gearset 830.

Figures 19, 20:
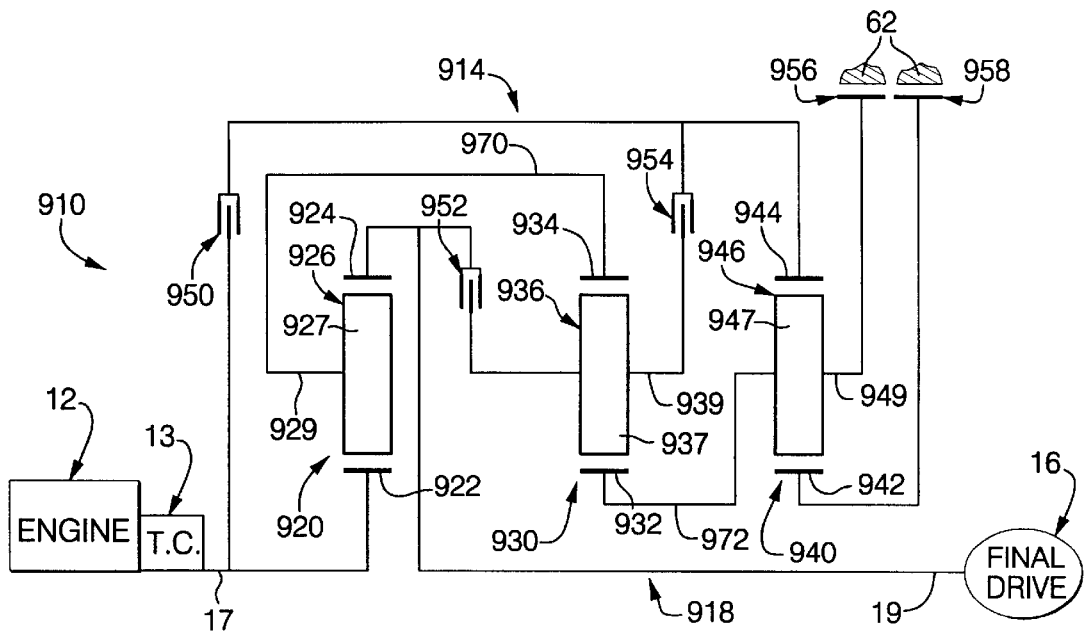
FIG. 19 is a schematic representation of a powertrain having a transmission incorporating another embodiment of the present invention.
FIG. 20 is a truth table and chart providing some of the operating characteristics of the powertrain shown in FIG. 19.

A powertrain 910, shown in FIG. 19, includes the engine 12, the starting device 13, a planetary transmission 914, and the final drive mechanism 16. The planetary transmission 914 includes the input shaft 17, a planetary gear arrangement 918, and the output shaft 19. The planetary gear arrangement 918 includes three simple planetary gearsets 920, 930, and 940, three rotating type torque-transmitting mechanisms 950, 952, and 954, and two stationary type torque-transmitting mechanisms 956 and 958.

The planetary gearset 920 includes a sun gear member 922, a ring gear member 924, and a planet carrier assembly member 926. The planet carrier assembly member 926 includes a plurality of pinion gear members 927 that are rotatably mounted on a planet carrier member 929 and disposed in meshing relationship with the sun gear member 922 and the ring gear member 924.

The planetary gearset 930 includes a sun gear member 932, a ring gear member 934, and a planet carrier assembly member 936. The planet carrier assembly member 936 includes a plurality of pinion gear members 937 that are rotatably mounted on a planet carrier member 939 and disposed in meshing relationship with the sun gear member 932 and the ring gear member 934.

The planetary gearset 940 includes a sun gear member 942, a ring gear member 944, and a planet carrier assembly member 946. The planet carrier assembly member 946 includes a plurality of pinion gear members 947 that are rotatably mounted on a planet carrier member 949 and disposed in meshing relationship with the sun gear member 942 and the ring gear member 944.

The input shaft 17 is continuously interconnected with the sun gear member 922, and selectively interconnectible with the ring gear member 944 through the torque-transmitting mechanism 950. The output shaft 19 is continuously interconnected with the ring gear member 924, and selectively interconnectible with the planet carrier assembly member 936 through the torque-transmitting mechanism 952. The planet carrier assembly member 926 and ring gear member 934 are continuously interconnected by an interconnecting member 970.

The sun gear member 932 and planet carrier assembly member 946 are continuously interconnected by an interconnecting member 972, which is selectively connectible with the transmission housing 62 through the torque-transmitting mechanism 956. The planet carrier assembly member 936 is selectively interconnectible with ring gear member 944 through the torque-transmitting mechanism 954. The sun gear member 942 is selectively interconnectible with the transmission housing 62 through the torque-transmitting mechanism 958.

The torque-transmitting mechanisms are selectively engaged in combinations of three to establish six forward speed ratios and one reverse speed ratio, as shown in the truth table of FIG. 20, between the input shaft 17 and the output shaft 19. Also given in the truth table of FIG. 20 is a numerical example of the speed ratios that are available with the planetary transmission 914 when the ring gear/sun gear tooth ratios of the planetary gearsets 920, 930, and 940 are chosen in FIG. 20 as R1/S1, R2/S2, and R3/S3, respectively. Also given in FIG. 20 is the numerical value for the ratio steps between the reverse and first forward speed ratio, the adjacent forward speed ratios, and the overall ratio spread of the forward speed ratios. These numerical values are determined from the speed ratio values given in the truth table.

The reverse speed ratio is established with the engagement of the torque-transmitting mechanisms 954, 956, and 958. During the reverse speed ratio, the ring gear member 924 and therefore output shaft 19 are rotated at a speed determined by the speed of the sun gear member 922 and the ring gear/sun gear tooth ratio of the planetary gearset 920. The numerical value of the reverse speed ratio is determined by the ring gear/sun gear tooth ratio of the planetary gearset 920.

The first forward speed ratio is established with the engagement of the torque-transmitting mechanisms 952, 956, and 958. During the first forward speed ratio, the planet carrier assembly member 926 and ring gear member 934 are rotated at a speed determined by the speed of the sun gear member 922, the speed of the ring gear member 924, and the ring gear/sun gear tooth ratio 920. The planet carrier assembly member 936, ring gear member 924, and output shaft 19 are rotated at a speed determined by the speed of the ring gear member 934 and the ring gear/sun gear tooth ratio of the planetary gearset 930. The numerical Value of the first forward speed ratio is determined by the ring gear/sun gear tooth ratios of the planetary gearsets 920 and 930.

The second forward speed ratio is established with the engagement of the torque-transmitting mechanisms 952, 954, and 958. During the second forward speed ratio, the planet carrier assembly member 926 and ring gear member 934 are rotated at a speed determined by the speed of the sun gear member 922, the speed of the ring gear member 924, and the ring gear/sun gear tooth ratio of the planetary gearset 920. The sun gear member 932 and planet carrier assembly member 946 are rotated at a speed determined by the speed of the ring gear member 934, the speed of the planet carrier assembly member 936, and the ring gear/sun gear tooth ratio of the planetary gearset 930. The ring gear member 944, planet carrier assembly member 936, ring gear member 924, and output shaft 19 are rotated at a speed determined by the speed of the planet carrier assembly member 946 and the ring gear/sun gear tooth ratio of the planetary gearset 940. The numerical value of the second forward speed ratio is determined by the ring gear/sun gear tooth ratios of all three planetary gearsets 920, 930, and 940.

The third forward speed ratio is established with the engagement of the torque-transmitting mechanisms 950, 952, and 958. During the third forward speed ratio, the planet carrier assembly member 946 and sun gear member 932 are rotated at a speed determined by the speed of the ring gear member 944 and the ring gear/sun gear tooth ratio of the planetary gearset 940. The ring gear member 934 and planet carrier assembly member 926 are rotated at a speed determined by the speed of the sun gear member 932, the speed of the planet carrier assembly member 936, and the ring gear/sun gear tooth ratio of the planetary gearset 930. The planet carrier assembly member 936, ring gear member 924, and the output shaft 19 are rotated at a speed determined by the speed of the planet carrier assembly member 926, the speed of the sun gear member 922, and the ring gear/sun gear tooth ratio of the planetary gearset 920. The numerical value of the third forward speed ratio is determined by the ring gear/sun gear tooth ratios of all three planetary gearsets 920, 930, and 940.

The fourth forward speed ratio is established with the engagement of the torque-transmitting mechanisms 950, 952, and 954. During the fourth forward speed ratio, the planetary gearsets 920 and 930 rotate in unison with the input shaft 17 and the output shaft 19. The numerical value of the fourth forward speed ratio is one.

The fifth forward speed ratio is established with the engagement of the torque-transmitting mechanisms 950, 954, and 958. During the fifth forward speed ratio, the planet carrier assembly member 946 and sun gear member 932 are rotated at a speed determined by the speed of the ring gear member 944 and the ring gear/sun gear tooth ratio of the planetary gearset 940. The ring gear member 934 and planet carrier assembly member 926 are rotated at a speed determined by the speed of the sun gear member 932, the speed of the planet carrier assembly member 936, and the ring gear/sun gear tooth ratio of the planetary gearset 930. The ring gear member 924 and therefore output shaft 19 are rotated at a speed determined by the speed of the sun gear member 922, the speed of the planet carrier assembly member 926, and the ring gear/sun gear tooth ratio of the planetary gearset 920. The numerical value of the fifth forward speed ratio is determined by the ring gear/sun gear tooth ratios of all three planetary gearsets 920, 930, and 940.

The sixth forward speed ratio is established with the engagement of the torque-transmitting mechanisms 950, 954, and 956. During the sixth forward speed ratio, the ring gear member 934 and planet carrier assembly member 926 are rotated at a speed determined by the speed of the planet carrier assembly member 936 and the ring gear/sun gear tooth ratio of the planetary gearset 930. The ring gear member 924 and therefore output shaft 19 are rotated at a speed determined by the speed of the planet carrier assembly member 926, the speed of the sun gear member 922, and the ring. gear/sun gear tooth ratio of the planetary gearset 920. The numerical value of the sixth forward speed ratio is determined by the ring gear/sun gear tooth ratios of the planetary gearsets 920 and 930.

Figures 21, 22:
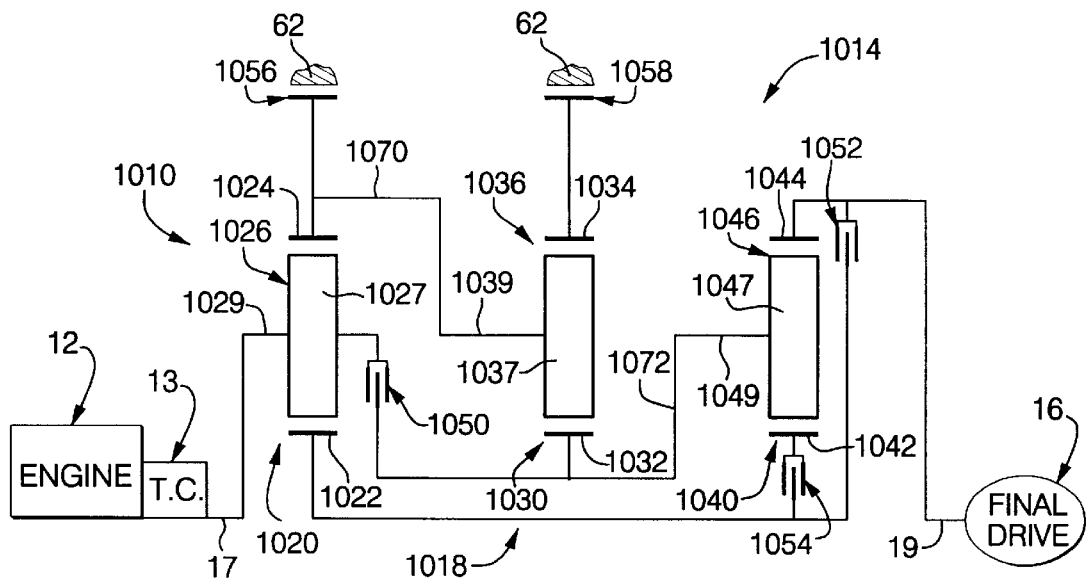
FIG. 21 is a schematic representation of a powertrain having a transmission incorporating another embodiment of the present invention.
FIG. 22 is a truth table and chart providing some of the operating characteristics of the powertrain shown in FIG. 21.

A powertrain 1010, shown in FIG. 21, includes the engine 12, the starting device 13, a planetary transmission 1014, and the final drive mechanism 16. The planetary transmission 1014 includes the input shaft 17, a planetary gear arrangement 1018, and the output shaft 19. The planetary gear arrangement 1018 includes three simple planetary gearsets 1020, 1030, and 1040, three rotating type torque-transmitting mechanisms 1050, 1052, and 1054, and two stationary type torque-transmitting mechanisms 1056 and 1058.

The planetary gearset 1020 includes a sun gear member 1022, a ring gear member 1024, and a planet carrier assembly member 1026. The planet carrier assembly member 1026 includes a plurality of pinion gear members 1027 that are rotatably mounted on a planet carrier member 1029 and disposed in meshing relationship with the sun gear member 1022 and the ring gear member 1024.

The planetary gearset 1030 includes a sun gear member 1032, a ring gear member 1034, and a planet carrier assembly member 1036. The planet carrier assembly member 1036 includes a plurality of pinion gear members 1037 that are rotatably mounted on a planet carrier member 1039 and disposed in meshing relationship with the sun gear member 1032 and the ring gear member 1034.

The planetary gearset 1040 includes a sun gear member 1042, a ring gear member 1044, and a planet carrier assembly member 1046. The planet carrier assembly member 1046 includes a plurality of pinion gear members 1047 that are rotatably mounted on a planet carrier member 1049 and disposed in meshing relationship with the sun gear member 1042 and the ring gear member 1044.

The input shaft 17 is continuously interconnected with the planet carrier assembly member 1026. The output shaft 19 is continuously interconnected with the ring gear member 1044. The ring gear member 1024 and planet carrier assembly member 1036 are continuously interconnected by an interconnecting member 1070, which is selectively connectible with the transmission housing 62 through the torque-transmitting mechanism 1056. The sun gear member 1032 and planet carrier assembly member 1046 are continuously interconnected by an interconnecting member 1072, which is selectively connectible with the input shaft 17 through the torque-transmitting mechanism 1050.

The sun gear member 1022 is selectively interconnectible with the sun gear member 1042 through the torque-transmitting mechanism 1054, and selectively interconnectible with the output shaft 19 through the torque-transmitting mechanism 1052. The ring gear member 1034 is selectively interconnectible with the transmission housing 62 through the torque-transmitting mechanism 1058.

The torque-transmitting mechanisms are selectively engaged in combinations of three, as shown in the truth table of FIG. 22, to establish six forward speed ratios and one reverse speed ratio between the input shaft 17 and the output shaft 19. The truth table also provides an example of numerical values for the speed ratios when the ring gear/sun gear tooth ratios of the planetary gearsets 1020, 1030, and 1040 are as described in FIG. 22 as R1/S1, R2/S2, and R3/S3, respectively. Also given in FIG. 22 is a chart providing the numerical value of the ratio steps between adjacent forward speed ratios, the reverse and first forward speed ratio, and the overall ratio spread of the forward speed ratios. These numerical values are determined from the speed ratio values given in the truth table.

Upon reviewing the engagement combinations and sequence, those skilled in the art will recognize that the numerical value of the reverse speed ratio and the first forward speed ratio is determined by the ring gear/sun gear tooth ratios of the planetary gearsets 1020 and 1040. The numerical value of the second forward speed ratio is determined by the ring gear/sun gear tooth ratios of all three planetary gearsets 1020, 1030, and 1040. The numerical value of the third forward speed ratio is one. The numerical value of the fourth forward speed ratio and the fifth forward speed ratio is determined by the ring gear/sun gear tooth ratios of the planetary gearsets 1020 and 1030. The numerical value of the sixth forward speed ratio is determined by the ring gear/sun gear tooth ratio of the planetary gearset 1020.

Figures 23, 24:
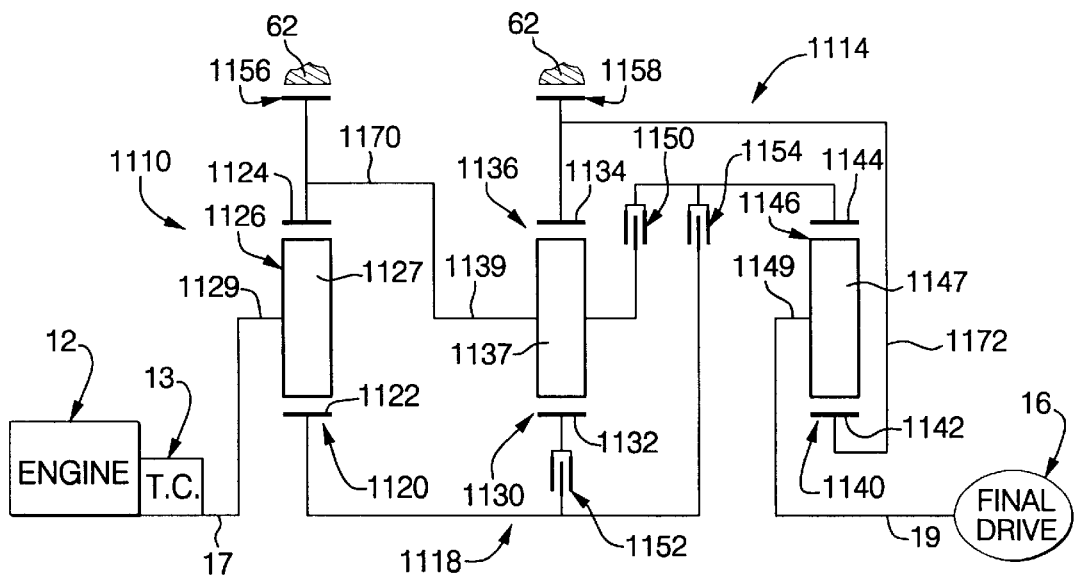
FIG. 23 is a schematic representation of a powertrain having a transmission incorporating another embodiment of the present invention.
FIG. 24 is a truth table and chart providing some of the operating characteristics of the powertrain shown in FIG. 23.

A powertrain 1110, shown in FIG. 23, includes the engine 12, the starting device 13, a planetary transmission 1114, and the final drive mechanism 16. The planetary transmission 1114 includes the input shaft 17, a planetary gear arrangement 1118, and the output shaft 19. The planetary gear arrangement 1118 includes three simple planetary gearsets 1120, 1130, and 1140, three rotating type torque-transmitting mechanisms 1150, 1152, and 1154, and two stationary type torque-transmitting mechanisms 1156 and 1158.

The planetary gearset 1120 includes a sun gear member 1122, a ring gear member 1124, and a planet carrier assembly member 1126. The planet carrier assembly member 1126 includes a plurality of pinion gear members 1127 that are rotatably mounted on a planet carrier member 1129 and disposed in meshing relationship with the sun gear member 1122 and the ring gear member 1124.

The planetary gearset 1130 includes a sun gear member 1132, a ring gear member 1134, and a planet carrier assembly member 1136. The planet carrier assembly member 1136 includes a plurality of pinion gear members 1137 that are rotatably mounted on a planet carrier member 1139 and disposed in meshing relationship with the sun gear member 1132 and the ring gear member 1134.

The planetary gearset 1140 includes a sun gear member 1142, a ring gear member 1144, and a planet carrier assembly member 1146. The planet carrier assembly member 1146 includes a plurality of pinion gear members 1147 that are rotatably mounted on a planet carrier member 1149 and disposed in meshing relationship with the sun gear member 1142 and the ring gear member 1144.

The input shaft 17 is continuously interconnected with the planet carrier assembly member 1126. The output shaft 19 is continuously interconnected with the planet carrier assembly member 1146. The ring gear member 1124 and planet carrier assembly member 1136 are continuously interconnected by an interconnecting member 1170, which is selectively connectible with the ring gear member 1144 through the torque-transmitting mechanism 1150, and selectively connectible with the transmission housing 62 through the torque-transmitting mechanism 1156.

The ring gear member 1134 and sun gear member 1142 are continuously interconnected by an interconnecting member 1172, which is selectively connectible with the transmission housing 62 through the torque-transmitting mechanism 1158. The sun gear member 1122 is selectively interconnectible with the sun gear member 1132 through the torque-transmitting mechanism 1152, and selectively interconnectible with the ring gear member 1144 through the torque-transmitting mechanism 1154.

The torque-transmitting mechanisms are selectively engageable in combinations of three, as shown in the truth table of FIG. 24. Also given in FIG. 24 is a numerical example of the speed ratios that are available with the planetary transmission 1114 between the input shaft 17 and the output shaft 19. These speed ratio values are determined by the ring gear/sun gear tooth ratios of the planetary gearsets 1120, 1130, and 1140 as represented by the ratios R1/S1, R2/S2, and R3/S3, respectively. Also provided in FIG. 24 is a chart providing a numerical example of the reverse-to-first speed ratio step, the speed ratio step between adjacent forward speed ratios, and the overall ratio spread of the forward speed ratios. These numerical values are determined from the speed ratio values given in the truth table.

Upon reviewing the engagement combinations and the connections made within the planetary gear arrangement 1118, those skilled in the art that the numerical value of the reverse speed ratio, the first forward speed ratio, the fourth forward speed ratio, and the fifth forward speed ratio are determined by the ring gear/sun gear tooth ratios of all three planetary gearsets 1120, 1130, and 1140. The numerical value of the second forward speed ratio is determined by the ring gear/sun gear tooth ratio of the planetary gearset 1140. The numerical value of the third forward speed ratio is one. The numerical value of the sixth forward speed ratio is determined by the ring gear/sun gear tooth ratios of the planetary gearsets 1120 and 1140.

Figures 25, 26:
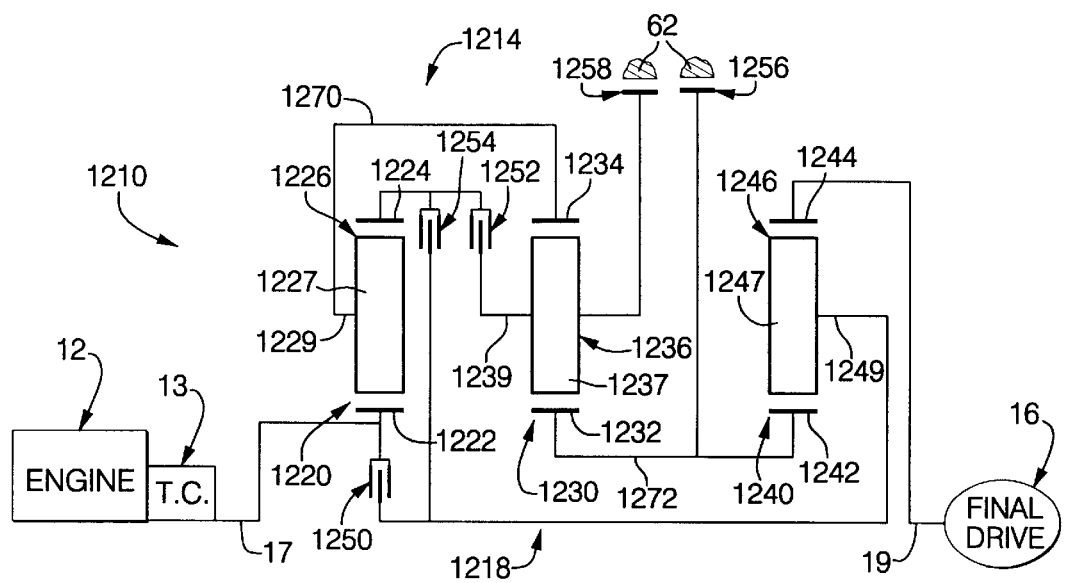
FIG. 25 is a schematic representation of a powertrain having a transmission incorporating another embodiment of the present invention.
FIG. 26 is a truth table and chart providing some of the operating characteristics of the powertrain shown in FIG. 25.

A powertrain 1210, shown in FIG. 25, includes the engine 12, the starting device 13, a planetary transmission 1214, and the final drive mechanism 16. The planetary transmission 1214 includes the input shaft 17, a planetary gear arrangement 1218, and the output shaft 19. The planetary gear arrangement 1218 includes three simple planetary gearsets 1220, 1230, and 1240, three rotating type torque-transmitting mechanisms 1250, 1252, and 1254, and two stationary type torque-transmitting mechanisms 1256 and 1258.

The planetary gearset 1220 includes a sun gear member 1222, a ring gear member 1224, and a planet carrier assembly member 1226. The planet carrier assembly member 1226 includes a plurality of pinion gear members 1227 that are rotatably mounted on a planet carrier member 1229 and disposed in meshing relationship with the sun gear member 1222 and the ring gear member 1224.

The planetary gearset 1230 includes a sun gear member 1232, a ring gear member 1234, and a planet carrier assembly member 1236. The planet carrier assembly member 1236 includes a plurality of pinion gear members 1237 that are rotatably mounted on a planet carrier member 1239 and disposed in meshing relationship with the sun gear member 1232 and the ring gear member 1234.

The planetary gearset 1240 includes a sun gear member 1242, a ring gear member 1244, and a planet carrier assembly member 1246. The planet carrier assembly member 1246 includes a plurality of pinion gear members 1247 that are rotatably mounted on a planet carrier member 1249 and disposed in meshing relationship with the sun gear member 1242 and the ring gear member 1244.

The input shaft 17 is continuously connected with the ring gear member 1222, and selectively interconnectible with the planet carrier assembly member 1246 through the torque-transmitting mechanism 1250. The output shaft 19 is continuously interconnected with the ring gear member 1244. The planet carrier assembly member 1226 and ring gear member 1234 are continuously interconnected by an interconnecting member 1270.

The sun gear members 1232 and 1242 are continuously interconnected by an interconnecting member 1272, which is selectively connectible with the transmission housing 62 through the torque-transmitting mechanism 1256. The ring gear member 1224 is selectively interconnectible with the planet carrier assembly member 1236 through the torque-transmitting mechanism 1252, and selectively interconnectible with the planet carrier assembly member 1246 through the torque-transmitting mechanism 1254. The planet carrier assembly member 1236 is selectively interconnectible with the transmission housing 62 through the torque-transmitting mechanism 1258.

The torque-transmitting mechanisms are engaged in combinations of three as shown in the truth table of FIG. 26. The sequence of engagements is also provided within the truth table, which describes the six forward speed ratios and one reverse speed ratio. The truth table in FIG. 26 also provides a numerical example of the speed ratios that are available with the planetary gear arrangement 1218 between the input shaft 17 and the output shaft 19. These speed ratio values are determined by the ring gear/sun gear tooth ratios of the planetary gearsets 1120, 1130, and 1140, which are represented by the ratios R1/S1, R2/S2, and R3/S3, respectively. Also provided in FIG. 26 is a chart providing a numerical example of the reverse-to-first ratio step, the ratio step between adjacent forward speed ratios, and the overall ratio spread of the forward speed ratios. These numerical values are determined from the speed ratio values given in the truth table.

Those skilled in the art, upon reviewing the truth table shown in FIG. 26 and the engagement combinations and the interconnections made within the planetary gear arrangement 1218, will recognize that the numerical value of the reverse speed ratio is determined by the ring gear/sun gear tooth ratios of the planetary gearsets 1220 and 1240. The numerical value of the first forward speed ratio, the second forward speed ratio, and the fifth forward speed ratio are determined by the ring gear/sun gear tooth ratios of all three planetary gearsets 1220, 1230, and 1240. The numerical value of the third forward speed ratio is one. The numerical value of the fourth forward speed ratio is determined by the ring gear/sun gear tooth ratio of the planetary gearset 1240. The numerical value of the sixth forward speed ratio is determined by the ring gear/sun gear tooth ratios of the planetary gearsets 1230 and 1240.

Figures 27, 28:
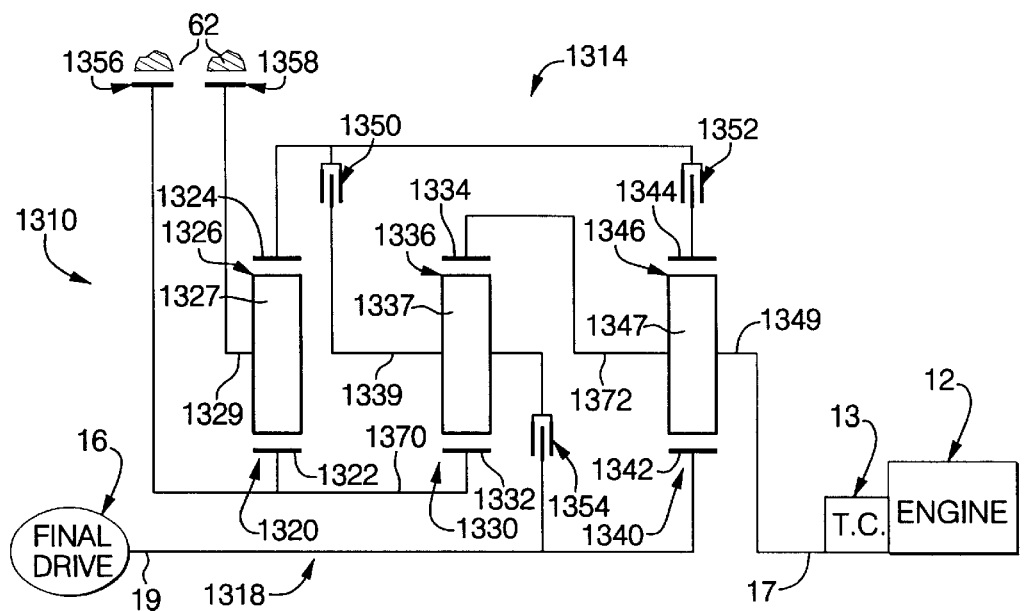
FIG. 27 is a schematic representation of a powertrain having a transmission incorporating another embodiment of the present invention.
FIG. 28 is a truth table and chart providing some of the operating characteristics of the powertrain shown in FIG. 27.

A powertrain 1310, shown in FIG. 27, includes the engine 12, the starting device 13, a planetary transmission 1314, and the final drive mechanism 16. The planetary transmission 1314 includes the input shaft 17, a planetary gear arrangement 1318, and the output shaft 19. The planetary gear arrangement 1318 includes three simple planetary gearsets 1320, 1330, and 1340, three rotating type torque-transmitting mechanisms 1350, 1352, and 1354, and two stationary type torque-transmitting mechanisms 1356 and 1358.

The planetary gearset 1320 includes a sun gear member 1322, a ring gear member 1324, and a planet carrier assembly member 1326. The planet carrier assembly member 1326 includes a plurality of pinion gear members 1327 that are rotatably mounted on a planet carrier member 1329 and disposed in meshing relationship with the sun gear member 1322 and the ring gear member 1324.

The planetary gearset 1330 includes a sun gear member 1332, a ring gear member 1334, and a planet carrier assembly member 1336. The planet carrier assembly member 1336 includes a plurality of pinion gear members 1337 that are rotatably mounted on a planet carrier member 1339 and disposed in meshing relationship with the sun gear member 1332 and the ring gear member 1334.

The planetary gearset 1340 includes a sun gear member 1342, a ring gear member 1344, and a planet carrier assembly member 1346. The planet carrier assembly member 1346 includes a plurality of pinion gear members 1347 that are rotatably mounted on a planet carrier member 1349 and disposed in meshing relationship with the sun gear member 1342 and the ring gear member 1344.

The input shaft 17 is continuously interconnected with an interconnecting member 1372, which continuously interconnects the ring gear member 1334 and the planet carrier assembly member 1346. The output shaft 19 is continuously interconnected with the sun gear member 1342, and selectively interconnectible with the planet carrier assembly member 1336 through the torque-transmitting mechanism 1354. The sun gear members 1322 and 1332 are continuously interconnected by an interconnecting member 1370, which is selectively connectible with the transmission housing 62 through the torque-transmitting mechanism 1336.

The ring gear member 1324 is selectively interconnectible with the planet carrier assembly member 1336 through the torque-transmitting mechanism 1350, and selectively interconnectible with the ring gear member 1344 through the torque-transmitting mechanism 1352. The planet carrier assembly member 1336 is selectively interconnectible with the output shaft 19 through the torque-transmitting mechanism 1354. The planet carrier assembly member 1326 is selectively interconnectible with the transmission housing 62 through the torque-transmitting mechanism 1358.

As seen in the truth table of FIG. 28, the torque-transmitting mechanisms are selectively engaged in combinations of three to establish six forward speed ratios and one reverse speed ratio between the input shaft 17 and the output shaft 19. Also given in the truth table is a numerical example of the speed ratios that are available with the planetary transmission 1314 when the ring gear/sun gear tooth ratios of the planetary gearsets 1320, 1330, and 1340 are as given in FIG. 28 as R1/S1, R2/S2, and R3/S3, respectively. The chart in FIG. 28 provides a numerical value for the reverse-to-first ratio step, the ratio step between adjacent forward speed ratios, and the overall ratio spread of the forward speed ratios when the numerical values of the speed ratios given in the truth table are employed. These numerical values are determined from the speed ratio values given in the truth table.

Upon reviewing the engagement combinations and the connections made thereby within the planetary transmission 1314, those skilled in the art will recognize that the numerical value of the reverse speed ratio and the fifth forward speed ratio is determined by the ring gear/sun gear tooth ratios of all three planetary gearsets 1320, 1330, and 1340. The numerical value of the first forward speed ratio is determined by the ring gear/sun gear tooth ratios of the planetary gearsets 1320 and 1330. The numerical value of the second forward speed ratio is determined by the ring gear/sun gear tooth ratio of the planetary gearset 1330. The numerical value of the third forward speed ratio is one. The numerical value of the fourth forward speed ratio is determined by the ring gear/sun gear tooth ratios of the planetary gearsets 1330 and 1340. The numerical value of the sixth forward speed ratio is determined by the ring gear/sun gear tooth ratio of the planetary gearset 1340.

Figures 29, 30:
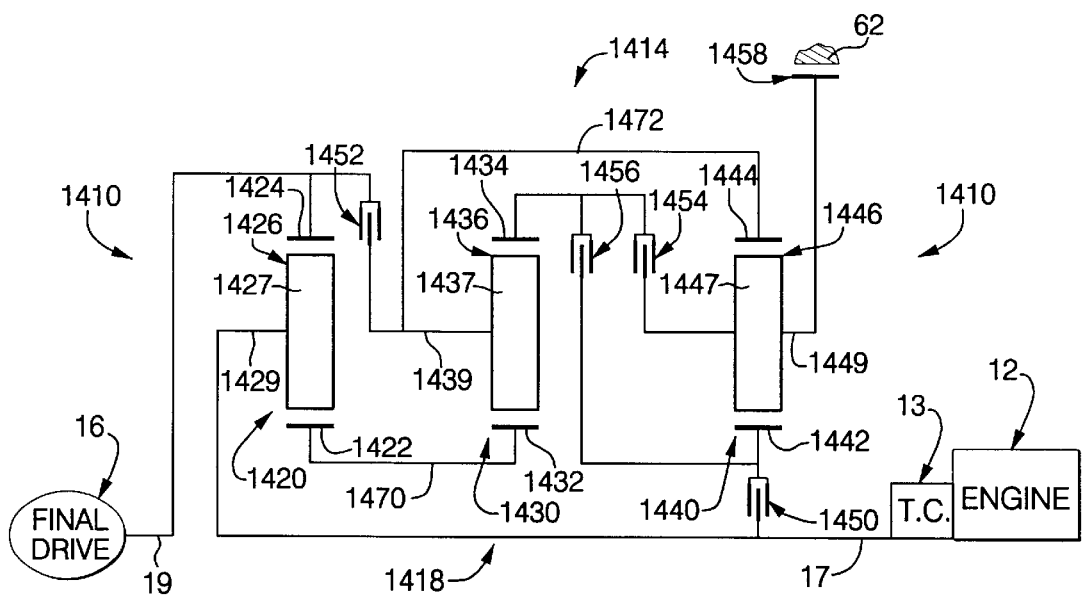
FIG. 29 is a schematic representation of a powertrain having a transmission incorporating another embodiment of the present invention.
FIG. 30 is a truth table and chart providing some of the operating characteristics of the powertrain shown in FIG. 29.

A powertrain 1410, shown in FIG. 29, includes the engine 12, the starting device 13, a planetary transmission 1414, and the final drive mechanism 16. The planetary transmission 1414 includes the input shaft 17, a planetary gear arrangement 1418, and the output shaft 19. The planetary gear arrangement 1418 includes three simple planetary gearsets 1420, 1430, and 1440, four rotating type torque-transmitting mechanisms 1450, 1452, 1454 and 1456, and one stationary type torque-transmitting mechanism 1458.

The planetary gearset 1420 includes a sun gear member 1422, a ring gear member 1424, and a planet carrier assembly member 1426. The planet carrier assembly member 1426 includes a plurality of pinion gear members 1427 that are rotatably mounted on a planet carrier member 1429 and disposed in meshing relationship with the sun gear member 1422 and the ring gear member 1424.

The planetary gearset 1430 includes a sun gear member 1432, a ring gear member 1434, and a planet carrier assembly member 1436. The planet carrier assembly member 1436 includes a plurality of pinion gear members 1437 that are rotatably mounted on a planet carrier member 1439 and disposed in meshing relationship with the sun gear member 1432 and the ring gear member 1434.

The planetary gearset 1440 includes a sun gear member 1442, a ring gear member 1444, and a planet carrier assembly member 1446. The planet carrier assembly member 1446 includes a plurality of pinion gear members 1447 that are rotatably mounted on a planet carrier member 1449 and disposed in meshing relationship with the sun gear member 1442 and the ring gear member 1444.

The input shaft 17 is continuously interconnected with the planet carrier assembly member 1426, and selectively interconnectible with the sun gear member 1442 through the torque-transmitting mechanism 1450. The sun gear members 1442 and 1432 are continuously interconnected by an interconnecting member 1470. The output shaft 19 is continuously interconnected with the ring gear member 1424, and selectively interconnectible with the planet carrier assembly member 1436 and ring gear member 1444 through the torque-transmitting mechanism 1452 and a continuous interconnecting member 1472.

The ring gear member 1434 is selectively interconnectible with the planet carrier assembly member 1446 through the torque-transmitting mechanism 1454, and selectively interconnectible with the sun gear member 1442 through the torque-transmitting mechanism 1456. The planet carrier assembly member 1446 is selectively interconnectible with the transmission housing 62 through the torque-transmitting mechanism 1458.

The torque-transmitting mechanisms are selectively engaged in combinations of three to establish six forward speed ratios and one reverse speed ratio between the input shaft 17 and the output shaft 19. These engagement combinations are shown in the truth table of FIG. 30. Also given in the truth table is a numerical example of the speed ratios that are available within the planetary transmission 1414 when the ring gear/sun gear tooth ratios of the planetary gearsets 1420, 1430, and 1440 are as shown in FIG. 30 as R1/S1, R2/S2, and R3/S3, respectively. Also shown in FIG. 30 is a chart giving the numerical value for the ratio step between the reverse-to-first forward speed ratio, the ratio steps between adjacent forward speed ratios, and the overall ratio spread of the forward speed ratios. These ratio step values are determined by the speed ratio values given in the truth table.

Those skilled in the art, upon reviewing the engagement combinations and the interconnections made within the planetary gear arrangement 1418, will recognize that the numerical value of reverse speed ratio is determined by the ring gear/sun gear tooth ratio of the planetary gearset 1440. The numerical value of the first forward speed ratio, the fifth forward speed ratio, and the sixth forward speed ratio is determined by the ring gear/sun gear tooth ratios of all three planetary gearsets 1420, 1430, and 1440. The numerical value of the second forward speed ratio is determined by the ring gear/sun gear tooth ratios of the planetary gearsets 1420 and 1430. The numerical of the third forward speed ratio is one. The numerical value of the fourth forward speed ratio is determined by the ring gear/sun gear tooth ratio of the planetary gearset 1420.

Figures 31, 32:
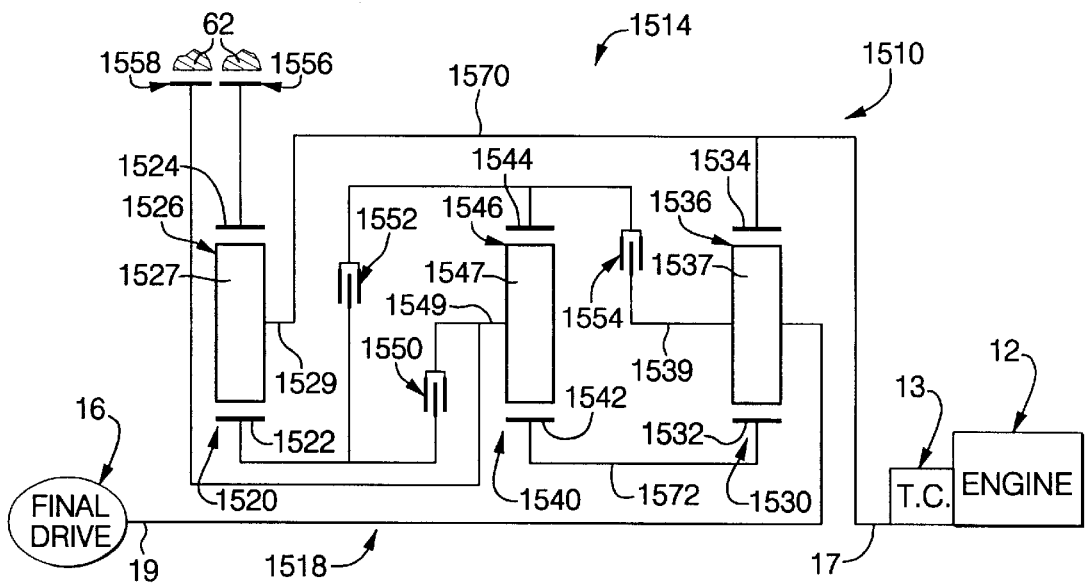
FIG. 31 is a schematic representation of a powertrain having a transmission incorporating another embodiment of the present invention.
FIG. 32 is a truth table and chart providing some of the operating characteristics of the powertrain shown in FIG. 31.

A powertrain 1510, shown in FIG. 31, includes the engine 12, the starting device 13, a planetary transmission 1514, and the final drive mechanism 16. The planetary transmission 1514 includes the input shaft 17, a planetary gear arrangement 1518, and the output shaft 19. The planetary gear arrangement 1518 includes three simple planetary gearsets 1520, 1530, and 1540, three rotating type torque-transmitting mechanisms 1550, 1552, and 1554, and two stationary type torque-transmitting mechanisms 1556 and 1558.

The planetary gearset 1520 includes a sun gear member 1522, a ring gear member 1524, and a planet carrier assembly member 1526. The planet carrier assembly member 1526 includes a plurality of pinion gear members 1527 that are rotatably mounted on a planet carrier member 1529 and disposed in meshing relationship with the sun gear member 1522 and the ring gear member 1524.

The planetary gearset 1530 includes a sun gear member 1532, a ring gear member 1534, and a planet carrier assembly member 1536. The planet carrier assembly member 1536 includes a plurality of pinion gear members 1537 that are rotatably mounted on a planet carrier member 1539 and disposed in meshing relationship with the sun gear member 1532 and the ring gear member 1534.

The planetary gearset 1540 includes a sun gear member 1542, a ring gear member 1544, and a planet carrier assembly member 1546. The planet carrier assembly member 1546 includes a plurality of pinion gear members 1547 that are rotatably mounted on a planet carrier member 1549 and disposed in meshing relationship with the sun gear member 1542 and the ring gear member 1544.

The input shaft 17 is continuously interconnected with the ring gear member 1534 and planet carrier assembly member 1526 through an interconnecting member 1570. The output shaft 19 is continuously interconnected with the planet carrier assembly member 1536, and selectively interconnectible with the ring gear member 1544 through the torque-transmitting mechanism 1554. The sun gear members 1542 and 1532 are continuously interconnected by an interconnecting member 1572.

The planet carrier assembly member 1546 is selectively interconnectible with the sun gear member 1522 through the torque-transmitting mechanism 1550, and selectively interconnectible with the transmission housing 62 through the torque-transmitting mechanism 1558. The ring gear member 1544 is selectively interconnectible with the sun gear member 1522 through the torque-transmitting mechanism 1552. The ring gear member 1524 is selectively interconnectible with the transmission housing 62 through the torque-transmitting mechanism 1556.

As seen in the truth table of FIG. 32, the torque-transmitting mechanisms are engaged in combinations of three to establish six forward speed ratios and one reverse speed ratio between the input shaft 17 and the output shaft 19. Also given in the truth table is a numerical example of the speed ratios that are available within the planetary transmission 1514. These speed ratios are determined by the ring gear/sun gear tooth ratios of the planetary gearsets 1520, 1540, and 1530, which are given as R1/S1, R2/S2, and R3/S3, respectively. FIG. 32 also provides a chart, which gives the numerical value for the reverse-to-first forward speed ratio step, the ratio steps between adjacent forward speed ratios, and the overall ratio spread of the forward speed ratios. These numerical values are determined from the speed ratio values given in the truth table of FIG. 32.

Those skilled in the art, upon reviewing the engagement combinations and the connections made thereby, will recognize that the numerical value of the reverse speed ratio and the fifth forward speed ratio is determined by the ring gear/sun gear tooth ratios of all three planetary gearsets 1520, 1530, and 1540. The numerical value of the first forward speed ratio is determined by the ring gear/sun gear tooth ratios of the planetary gearsets 1530 and 1540. The numerical value of the second forward speed ratio is determined by the ring gear/sun gear tooth ratio of the planetary gearset 1530. The numerical value of the third forward speed ratio is one. The numerical value of the fourth forward speed ratio is determined by the ring gear/sun gear tooth ratios of the planetary gearsets 1520 and 1530. The numerical value of the sixth forward speed ratio is determined by the ring gear/sun gear tooth ratio of the planetary gearset 1520.

Figures 33, 34:
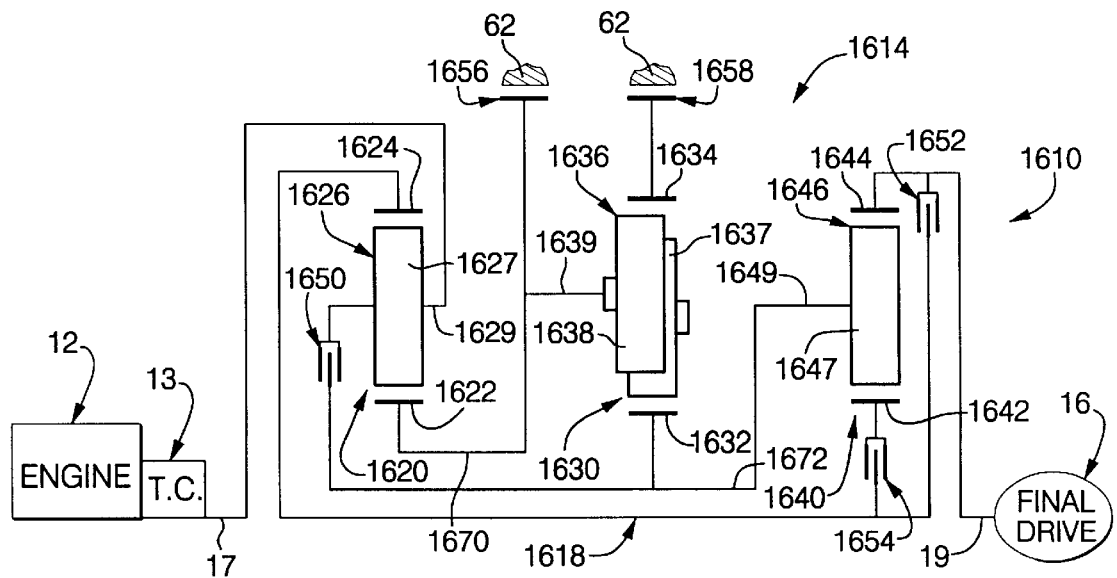
FIG. 33 is a schematic representation of a powertrain having a transmission incorporating another embodiment of the present invention.
FIG. 34 is a truth table and chart providing some of the operating characteristics of the powertrain shown in FIG. 33.

A powertrain 1610, shown in FIG. 33, includes the engine 12, the starting device 13, a planetary transmission 1614, and the final drive mechanism 16. The planetary transmission 1614 includes the input shaft 17, a planetary gear arrangement 1618, and the output shaft 19. The planetary gear arrangement 1618 includes two simple planetary gearsets 1620 and 1640, and one compound planetary gearset 1630. The planetary gear arrangement 1618 also includes three rotating type torque-transmitting mechanisms 1650, 1652, and 1654, and two stationary type torque-transmitting mechanisms 1656 and 1658.

The planetary gearset 1620 includes a sun gear member 1622, a ring gear member 1624, and a planet carrier assembly member 1626. The planet carrier assembly member 1626 includes a plurality of pinion gear members 1627 that are rotatably mounted on a planet carrier member 1629 and disposed in meshing relationship with the sun gear member 1622 and the ring gear member 1624.

The planetary gearset 1630 includes a sun gear member 1632, a ring gear member 1634, and a planet carrier assembly member 1636. The planet carrier assembly member 1636 includes a plurality of meshing pinion gear members 1637 and 1638 that are rotatably mounted on a planet carrier member 1639 and disposed in meshing relationship with the sun gear member 1632 and the ring gear member 1634, respectively.

The planetary gearset 1640 includes a sun gear member 1642, a ring gear member 1644, and a planet carrier assembly member 1646. The planet carrier assembly member 1646 includes a plurality of pinion gear members 1647 that are rotatably mounted on a planet carrier member 1649 and disposed in meshing relationship with the sun gear member 1642 and the ring gear member 1644.

The input shaft 17 is continuously interconnected with the planet carrier assembly member 1626. The output shaft 19 is continuously interconnected with the ring gear member 1644. The sun gear member 1622 and planet carrier assembly member 1636 are continuously interconnected by an interconnecting member 1670, which is selectively connectible with the transmission housing 62 through the torque-transmitting mechanism 1656.

The sun gear member 1632 and planet carrier assembly member 1646 are continuously interconnected by an interconnecting member 1672, which is selectively interconnectible with the input shaft 17 through the torque-transmitting mechanism 1650. The ring gear member 1624 is selectively interconnectible with the sun gear member 1642 through the torque-transmitting mechanism 1654, and selectively interconnectible with the output shaft 19 through the torque-transmitting mechanism 1652. The ring gear member 1634 is selectively interconnectible with the transmission housing 62 through the torque-transmitting mechanism 1658.

The torque-transmitting mechanisms, as seen in the truth table of FIG. 34, are selectively engaged in combinations of three to establish six forward speed ratios and one reverse speed ratio between the input shaft 17 and the output shaft 19. The truth table also provides a numerical example for each of the speed ratios. These numerical values are determined by the ring gear/sun gear tooth ratios 1620, 1630, and 1640, which are given in FIG. 34 as R1/S1, R2/S2, and R3/S3, respectively. A chart in FIG. 34 provides a numerical value for the ratio steps between the reverse and first forward speed ratio, the ratio steps between adjacent forward speed ratios, and the overall ratio spread of the forward speed ratios. The numerical values of the chart are determined from the speed ratio values given in the truth table.

Those skilled in the art, upon reviewing the engagement combinations and connections made thereby, will recognize that the numerical value of the reverse speed ratio and the second forward speed ratio is determined by the ring gear/sun gear tooth ratios of the planetary gearsets 1620 and 1640. The numerical value of the first forward speed ratio is determined by the ring gear/sun gear tooth ratios of all three planetary gearsets 1620, 1630, and 1640. The numerical value of the third forward speed ratio is one. The numerical value of the fourth forward speed ratio is determined by the ring gear/sun gear tooth ratio of the planetary gearset 1620. The numerical value of the fifth forward speed ratio and the sixth forward speed ratio is determined by the ring gear/sun gear tooth ratios of the planetary gearsets 1620 and 1630.

Figures 35, 36:
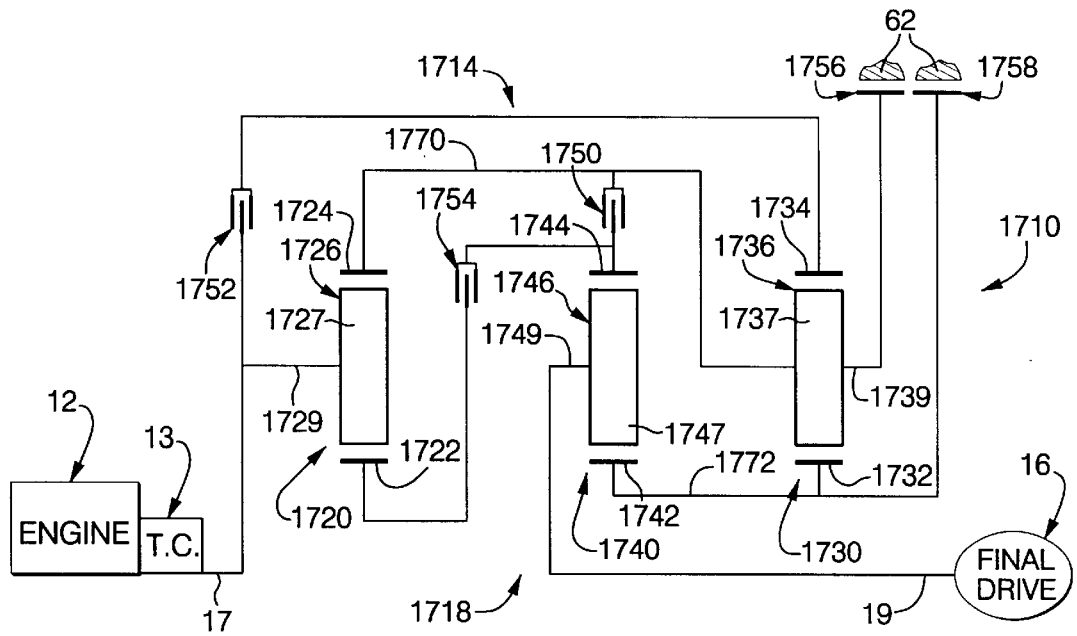
FIG. 35 is a schematic representation of a powertrain having a transmission incorporating another embodiment of the present invention.
FIG. 36 is a truth table and chart providing some of the operating characteristics of the powertrain shown in FIG. 35.

A powertrain 1710, shown in FIG. 35, includes the engine 12, the starting device 13, a planetary transmission 1714, and the final drive mechanism 16. The planetary transmission 1714 includes the input shaft 17, a planetary gear arrangement 1718, and the output shaft 19. The planetary gear arrangement 1718 includes three simple planetary gearsets 1720, 1730, and 1740, three rotating type torque-transmitting mechanisms 1750, 1752, and 1754, and two stationary type torque-transmitting mechanisms 1756 and 1758.

The planetary gearset 1720 includes a sun gear member 1722, a ring gear member 1724, and a planet carrier assembly member 1726. The planet carrier assembly member 1726 includes a plurality of pinion gear members 1727 that are rotatably mounted on a planet carrier member 1729 and disposed in meshing relationship with the sun gear member 1722 and the ring gear member 1724.

The planetary gearset 1730 includes a sun gear member 1732, a ring gear member 1734, and a planet carrier assembly member 1736. The planet carrier assembly member 1736 includes a plurality of pinion gear members 1737 that are rotatably mounted on a planet carrier member 1739 and disposed in meshing relationship with the sun gear member 1732 and the ring gear member 1734.

The planetary gearset 1740 includes a sun gear member 1742, a ring gear member 1744, and a planet carrier assembly member 1746. The planet carrier assembly member 1746 includes a plurality of pinion gear members 1747 that are rotatably mounted on a planet carrier member 1749 and disposed in meshing relationship with the sun gear member 1742 and the ring gear member 1744.

The input shaft 17 is continuously interconnected with the planet carrier assembly member 1726, and selectively interconnectible with the ring gear member 1734 through the torque-transmitting mechanism 1752. The output shaft 19 is continuously interconnected with the planet carrier assembly member 1746. The ring gear member 1724 is continuously interconnected with the planet carrier assembly member 1736 through an interconnecting member 1770. The sun gear members 1732 and 1742 are continuously interconnected by an interconnecting member 1772, which is selectively interconnectible with the transmission housing 62 through the torque-transmitting mechanism 1758.

The interconnecting member 1770 is selectively interconnectible with the ring gear member 1744 through the torque-transmitting mechanism 1750, and selectively interconnectible with the transmission housing 62 through the torque-transmitting mechanism 1756. The sun gear member 1722 is selectively interconnectible with the ring gear member 1744 through the torque-transmitting mechanism 1754.

As seen in the truth table of FIG. 36, the torque-transmitting mechanisms are selectively engaged in combinations of three to establish six forward speed ratios and one reverse speed ratio between the input shaft 17 and the output shaft 19. The truth table also provides a numerical example for the speed ratios that are available with the planetary transmission 1714. These numerical examples are determined by the ring gear/sun gear tooth ratios of the planetary gearsets 1720, 1740, and 1730, which are given in FIG. 36 as R1/S1, R2/S2, and R3/S3, respectively. A chart in FIG. 36 gives a numerical example of the ratio steps between the reverse and first forward speed ratio, the ratio steps between adjacent forward speed ratios, and the overall ratio spread of the forward speed ratios. These numerical values are determined by the speed ratio values given in the truth table.

Upon reviewing the engagement combinations and the interconnections within the planetary gear arrangement 1718, those skilled in the art will recognize that the numerical value of the reverse speed ratio and the first forward speed ratio is determined by the ring gear/sun gear tooth ratios of the planetary gearsets 1730 and 1740. The numerical value of the second forward speed ratio is determined by the ring gear/sun gear tooth ratio of the planetary gearset 1740. The numerical value of the third forward speed ratio is one. The numerical value of the fourth forward speed ratio and the fifth forward speed ratio is determined by the ring gear/sun gear tooth ratios of all three planetary gearsets 1720, 1730, and 1740. The numerical value of the sixth forward speed ratio is determined by the ring gear/sun gear tooth ratios of the planetary gearsets 1720 and 1740.

Figures 37, 38:
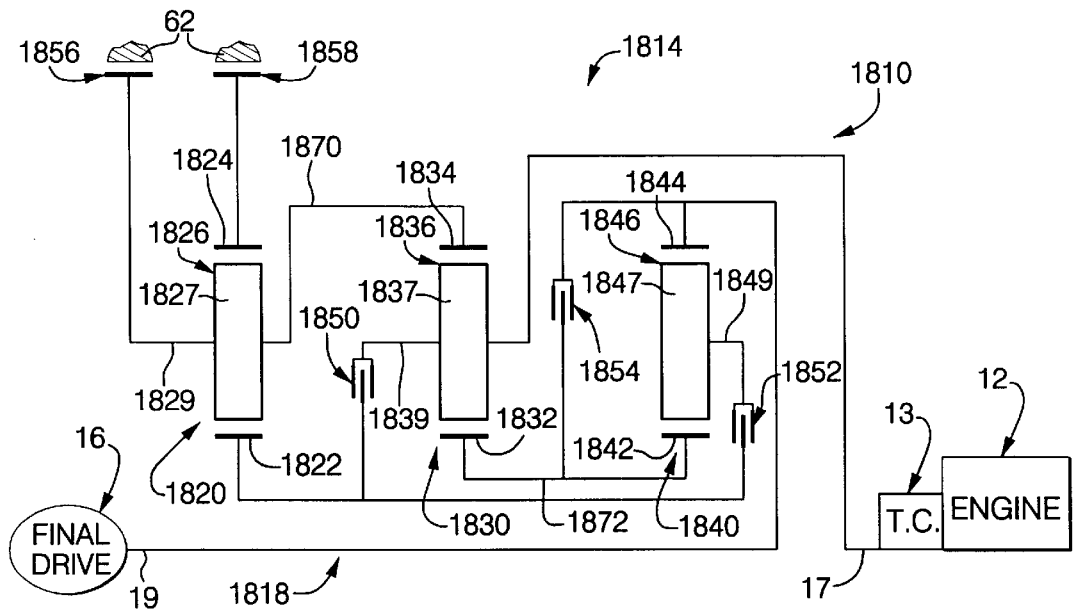
FIG. 37 is a schematic representation of a powertrain having a transmission incorporating another embodiment of the present invention.
FIG. 38 is a truth table and chart providing some of the operating characteristics of the powertrain shown in FIG. 37.

A powertrain 1810, shown in FIG. 37, includes the engine 12, the starting device 13, a planetary transmission 1814, and the final drive mechanism 16. The planetary transmission 1814 includes the input shaft 17, a planetary gear arrangement 1818, and the output shaft 19. The planetary gear arrangement 1818 includes three simple planetary gearsets 1820, 1830, and 1840, three rotating type torque-transmitting mechanisms 1850, 1852, and 1854, and two stationary type torque-transmitting mechanisms 1856 and 1858.

The planetary gearset 1820 includes a sun gear member 1822, a ring gear member 1824, and a planet carrier assembly member 1826. The planet carrier assembly member 1826 includes a plurality of pinion gear members 1827 that are rotatably mounted on a planet carrier member 1829 and disposed in meshing relationship with the sun gear member 1822 and the ring gear member 1824.

The planetary gearset 1830 includes a sun gear member 1832, a ring gear member 1834, and a planet carrier assembly member 1836. The planet carrier assembly member 1836 includes a plurality of pinion gear members 1837 that are rotatably mounted on a planet carrier member 1839 and disposed in meshing relationship with the sun gear member 1832 and the ring gear member 1834.

The planetary gearset 1840 includes a sun gear member 1842, a ring gear member 1844, and a planet carrier assembly member 1846. The planet carrier assembly member 1846 includes a plurality of pinion gear members 1847 that are rotatably mounted on a planet carrier member 1849 and disposed in meshing relationship with the sun gear member 1842 and the ring gear member 1844.

The input shaft 17 is continuously interconnected with the planet carrier assembly member 1836, and selectively interconnectible with the sun gear member 1822 through the torque-transmitting mechanism 1850. The output shaft 19 is continuously interconnected with the ring gear member 1844, and selectively interconnectible with an interconnecting member 1872 through the torque-transmitting mechanism 1854. The interconnecting member 1872 continuously interconnects the sun gear members 1832 and 1842. The planet carrier assembly member 1826 and ring gear member 1834 are continuously interconnected by an interconnecting member 1870, which is selectively interconnectible with the transmission housing 62 through the torque-transmitting mechanism 1856.

The sun gear member 1822 is selectively interconnectible with the planet carrier assembly member 1846 through the torque-transmitting mechanism 1852. The ring gear member 1824 is selectively interconnectible with the transmission housing 62 through the torque-transmitting mechanism 1858.

The torque-transmitting mechanisms are selectively engageable in combinations of three to establish six forward speed ratios and one reverse speed ratio as seen in the truth table of FIG. 38. Also given in the truth table is a numerical example of the speed ratio values that are available with the planetary transmission 1814. These numerical examples are determined by the ring gear/sun gear tooth ratios of the planetary gearsets 1820, 1830, and 1840, which are given in FIG. 38 as R1/S1, R2/S2, and R3/S3, respectively. A chart in FIG. 38 gives a numerical example of the ratio steps between the reverse and first forward speed ratio, the ratio steps between adjacent forward speed ratios, and the overall ratio spread of the forward speed ratios. These numerical values are determined by the numerical values of the speed ratios given in the truth table.

Upon reviewing the engagement combinations shown in the truth table and the interconnections made within the planetary gear arrangement 1818, those skilled in the art will recognize that the numerical value of the reverse speed ratio and the first forward speed ratio is determined by the ring gear/sun gear tooth ratios of the planetary gearsets 1830 and 1840. The numerical value of the second forward speed ratio is determined by the ring gear/sun gear tooth ratios of all three planetary gearsets 1820, 1830, and 1840. The numerical value of the third forward speed ratio is one. The numerical value of the fourth forward speed ratio and the fifth forward speed ratio is determined by the ring gear/sun gear tooth ratios of the planetary gearsets 1820 and 1830. The numerical value of the sixth forward speed ratio is determined by the ring gear/sun gear tooth ratio of the planetary gearset 1830.

Figures 39, 40:
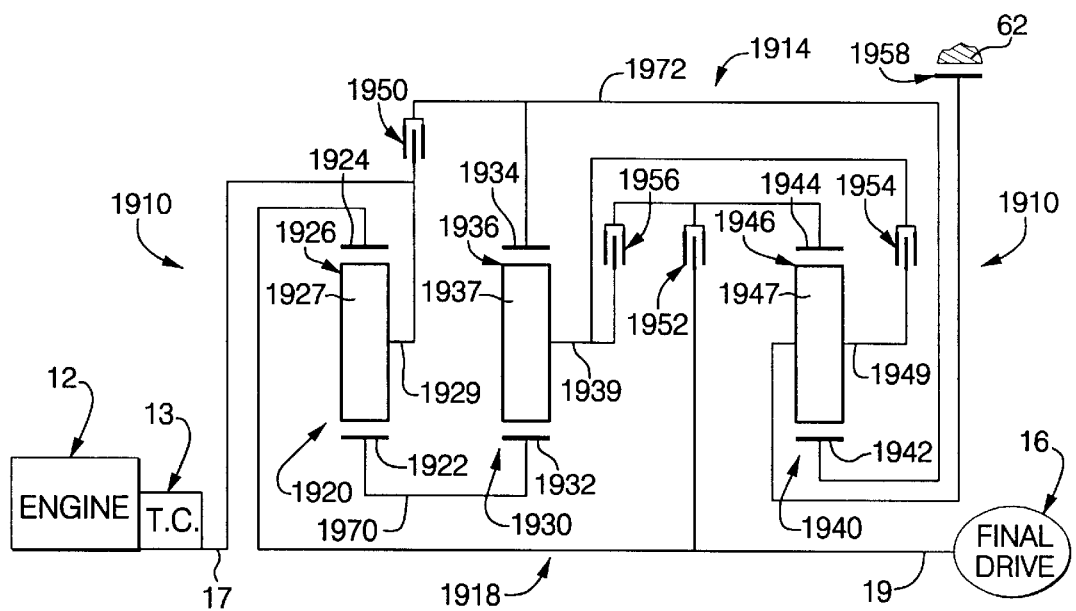
FIG. 39 is a schematic representation of a powertrain having a transmission incorporating another embodiment of the present invention.
FIG. 40 is a truth table and chart providing some of the operating characteristics of the powertrain shown in FIG. 39.

A powertrain 1910, shown in FIG. 39, includes the engine 12, the starting device 13, a planetary transmission 1914, and the final drive mechanism 16. The planetary transmission 1914 includes the input shaft 17, a planetary gear arrangement 1918, and the output shaft 19. The planetary gear arrangement 1918 includes three simple planetary gearsets 1920, 1930, and 1940, four rotating type torque-transmitting mechanisms 1950, 1952, 1954 and 1956, and one stationary type torque-transmitting mechanism 1958.

The planetary gearset 1920 includes a sun gear member 1922, a ring gear member 1924, and a planet carrier assembly member 1926. The planet carrier assembly member 1926 includes a plurality of pinion gear members 1927 that are rotatably mounted on a planet carrier member 1929 and disposed in meshing relationship with the sun gear member 1922 and the ring gear member 1924.

The planetary gearset 1930 includes a sun gear member 1932, a ring gear member 1934, and a planet carrier assembly member 1936. The planet carrier assembly member 1936 includes a plurality of pinion gear members 1937 that are rotatably mounted on a planet carrier member 1939 and disposed in meshing relationship with the sun gear member 1932 and the ring gear member 1934.

The planetary gearset 1940 includes a sun gear member 1942, a ring gear member 1944, and a planet carrier assembly member 1946. The planet carrier assembly member 1946 includes a plurality of pinion gear members 1947 that are rotatably mounted on a planet carrier member 1949 and disposed in meshing relationship with the sun gear member 1942 and the ring gear member 1944.

The input shaft 17 is continuously interconnected with the planet carrier assembly member 1926, and selectively interconnectible with an interconnecting member 1972 through the torque-transmitting mechanism 1950. The output shaft 19 is continuously interconnected with the ring gear member 1924, and selectively interconnectible with the ring gear member 1944 through the torque-transmitting mechanism 1952.

The sun gear members 1922 and 1932 are continuously interconnected by an interconnecting member 1970. The ring gear member 1934 and sun gear member 1942 are continuously interconnected by the interconnecting member 1972. The planet carrier assembly member 1946 is selectively interconnectible with the planet carrier assembly member 1936 through the torque-transmitting mechanism 1954, and selectively connectible with the transmission housing 62 through the torque-transmitting mechanism 1958. The planet carrier assembly member 1936 is selectively interconnectible with the ring gear member 1944 through the torque-transmitting mechanism 1956.

The torque-transmitting mechanisms are selectively engaged in combinations of three, as shown in the truth table of FIG. 40, to establish six forward speed ratios and one reverse speed ratio between the input shaft 17 and the output shaft 19. The truth table also provides a numerical example of the six forward speed ratios and the reverse speed ratio that are available with the planetary transmission 1914. These numerical values are determined by the ring gear/sun gear tooth ratios of the planetary gearsets 1920, 1930, and 1940, which are given in FIG. 40 as R1/S1, R2/S2, and R3/S3, respectively. A chart in FIG. 40 gives the numerical value for the reverse-to-first ratio step, the ratio steps between adjacent forward speed ratios, and the overall ratio spread of the forward speed ratios. These numerical values are determined by the speed ratios given in the truth table of FIG. 40.

Those skilled in the art will recognize that, with the engagement combinations shown in FIG. 40 and the interconnections made within the planetary gear arrangement 1918, the numerical value of the reverse speed ratio is determined by the ring gear/sun gear tooth ratio of the planetary gearset 1940. The numerical value of the first forward speed ratio, the second forward speed ratio, and the sixth forward speed ratio is determined by the ring gear/sun gear tooth ratios of all three planetary gearsets 1920, 1930, and 1940. The numerical value of the third forward speed ratio is one. The numerical value of the fourth forward speed ratio is determined by the ring gear/sun gear tooth ratio of the planetary gearset 1920. The numerical value of the fifth forward speed ratio is determined by the ring gear/sun gear tooth ratios of the planetary gearsets 1920 and 1930.

Upon reviewing the embodiments of the family members described above, it should now be apparent that each family member has many common elements. Each family member includes three planetary gearsets, and each of the planetary gearsets has three members. Each family member has an input shaft, which is continuously interconnected with at least one member of one of the planetary gearsets, an output shaft that is continuously interconnected with at least one of the other members of the planetary gearsets, and two continuous interconnecting members. One of the interconnecting members interconnects a first member of the first planetary gearset with a first member of the second planetary gearset, while the other interconnecting member interconnects the second member of the first planetary gearset with a first member of the third planetary gearset.

Also, each family member includes five torque-transmitting mechanisms, at least three of which are rotating type torque-transmitting mechanisms, commonly termed clutches, and at least one of which is a stationary type torque-transmitting mechanism, commonly termed a brake. The remaining torque-transmitting mechanism is either a rotating type or stationary type, depending upon the particular family member, which is being considered. In each of the family members, the torque-transmitting mechanisms are engaged in combinations of three to establish six forward speed ratios and one reverse speed ratio between input shaft and output shaft of the family member.

What is claimed is:

1. A transmission comprising:
   an input shaft;
   an output shaft;
   a transmission housing;
   a first planetary gearset having a first member, a second member, and a third member;
   a second planetary gearset having a first member, a second member, and a third member;
   a third planetary gearset having a first member, a second member, and a third member;
   said input shaft being continuously interconnected with at least one of said members of one of said planetary gearsets;
   said output shaft being continuously interconnected with at least another one of said members of one of said planetary gearsets;
   a first interconnecting member continuously interconnecting said first member of said first planetary gearset with said first member of said second planetary gearset;
   a second interconnecting member continuously interconnecting said second member of said second planetary gearset with said first member of said third planetary gearset; and
   five selectively engageable torque-transmitting mechanisms that selectively interconnect the members of the planetary gearsets with said input shaft, said output shaft, said transmission housing or other members of the planetary gearsets, and that are engaged in combinations of three to establish at least six forward speed ratios and one reverse speed ratio between said input shaft and said output shaft of said transmission.

2. The transmission defined in claim 1 further comprising:
   the first of said torque-transmitting mechanisms selectively interconnects a member of one of the said first and said second planetary gearsets with a member of said third planetary gearset;
   the second of said torque-transmitting mechanisms selectively interconnects a member of one said second and said third planetary gearsets with another member of one of said first, said second, and said third planetary gearsets;
   the third of said torque-transmitting mechanisms selectively interconnects a member of a group consisting of said first planetary gearset, said second planetary gearset, said first interconnecting member and said second interconnecting member with a member of a group consisting of said members of said first, said second, and said third planetary gearsets;
   the fourth of said torque-transmitting mechanisms selectively interconnects a member of a group consisting of a member of said first, said second, and said third planetary gearsets with a member of a group consisting of another member of said first, said second, and said third planetary gearsets, and said transmission housing; and
   the fifth of said torque-transmitting mechanisms selectively interconnects a member selected from a group consisting of said first, said second, and said third planetary gearsets with said transmission housing.

3. The transmission defined in claim 2 further comprising:
   each of said first members of each of said first, second, and third planetary gearsets being a member of group consisting of a sun gear member, a ring gear member, and a carrier assembly member;
   each of said second members of each of said first, second, and third planetary gearsets being a member of group consisting of a sun gear member, a ring gear member, and a carrier assembly member that is not said first member; and
   each of said third members of each of said first, second, and third planetary gearsets being a member of group consisting of a sun gear member, a ring gear member, and a carrier assembly member that is not said first and second member.

4. A transmission comprising:
   an input shaft;
   an output shaft;
   a transmission housing;
   a first planetary gearset having a first member, a second member, and a third member;
   a second planetary gearset having a first member continuously interconnected by a first interconnecting member with said first member of said first planetary gearset, a second member, and a third member;
   a third planetary gearset having a first member continuously interconnected by a second interconnecting member with said second member of said second planetary gearset, a second member, and a third member;
   said input shaft being continuously interconnected with a member of a group consisting of said second member of said first planetary gearset, said third member of said second planetary gearset, said first interconnecting member, and said second interconnecting member;
   said output shaft being continuously interconnected with a member of a group consisting of said third member of said first planetary gearset, said third member of said second planetary gearset, and said second member of said third planetary gearset; and five selectively engageable torque transmitting mechanisms that selectively interconnect the members of the planetary gearsets with said transmission housing, said input shaft, said output shaft or other members of the planetary gearsets, and that are engaged in combinations of three to establish at least six forward speed ratios and one reverse ratio between said input shaft and said output shaft.

5. The transmission defined in claim 4 further comprising:

the first of said torque transmitting mechanisms being selectively connectable between a member of a group consisting of said input shaft, said second member of said first planetary gearset, and said first interconnecting member and a member of a group consisting of said second member of said first planetary gearset, said second member of said second planetary gearset, said third member of said second planetary gearset, said third member of said third planetary gearset, and said second interconnecting member;

the second of said torque transmitting mechanisms being selectively connectable between a member of a group consisting of said second member of said first planetary gearset, said third member of said first planetary gearset, said first interconnecting member, and said output shaft and a member of a group consisting of said third members of said planetary gearsets and said second interconnecting member;

the third of said torque transmitting mechanisms being selectively interconnectable between said second member of said third planetary gearset, said third member of said third planetary gearset, and said second interconnecting member and a member of a group consisting of said third members of said planetary gearsets, said second-member of said first planetary gearset, and said first interconnecting member;

the fourth of said torque transmitting mechanisms being selectively interconnectable between a member of a group consisting of said transmission housing and said second member of said third planetary gearset and a member of a group consisting of said third members of said first and second planetary gearsets, said first interconnecting member, and said second interconnecting member; and the fifth of said torque transmitting mechanisms being selectively interconnectable between said transmission housing and a member of a group consisting of said third members of said planetary gearsets, said second member of said third planetary gearset, and said second interconnecting member.

6. The transmission defined in claim 5 further comprising:

each of said first members of each of said first, second, and third planetary gearsets being a member selected from a first group consisting of a sun gear member, a ring gear member, and a carrier assembly member;

each of said second members of each of said first, second, and third planetary gearsets being a member selected from a second group consisting of the members of said first group not selected as said first member; and each of said third members of each of said first, second, and third planetary gearsets being a member selected from a third group consisting of a sun gear member, a ring gear member, and a carrier assembly member that is not selected as said first and second member.

* * * * *